: US008597107B2

(12) United States Patent
Delaney et al.

(10) Patent No.: US 8,597,107 B2
(45) Date of Patent: Dec. 3, 2013

(54) SYSTEMS, METHODS, AND DEVICES FOR PROVIDING PURCHASES OF INSTANCES OF GAME PLAY AT A HYBRID TICKET/CURRENCY GAME MACHINE

(75) Inventors: Mick Delaney, Reno, NV (US); Warren White, Tacoma, WA (US); Dale Hermansen, Reno, NV (US); Travis Green, Washoe Valley, NV (US); Doug Harvey, Reno, NV (US); Nate Burkett, Washoe Valley, NV (US); Eugene Malina, Reno, NV (US); Dale Shepherd, Fort Collins, CO (US)

(73) Assignee: Bally Gaming, Inc., Las Vegas, NV (US)

( * ) Notice: Subject to any disclaimer, the term of this patent is extended or adjusted under 35 U.S.C. 154(b) by 1332 days.

(21) Appl. No.: 11/966,840

(22) Filed: Dec. 28, 2007

(65) Prior Publication Data
US 2009/0170594 A1   Jul. 2, 2009

(51) Int. Cl.
*A63F 13/00* (2006.01)
(52) U.S. Cl.
USPC ............................ 463/25; 463/16; 705/68
(58) Field of Classification Search
USPC .............. 463/25, 26, 27, 40–42, 16, 20
See application file for complete search history.

(56) References Cited

U.S. PATENT DOCUMENTS

| 3,751,041 A | 8/1973 | Seifert ........................ 273/149 P |
| 3,787,660 A | 1/1974 | Meyers et al. ........... 235/61.9 R |
| 3,814,436 A | 6/1974 | Boren ........................ 273/149 P |
| 3,966,047 A | 6/1976 | Steiner .......................... 209/75 |
| 4,031,376 A | 6/1977 | Corkin, Jr. .................... 235/156 |
| 4,108,361 A | 8/1978 | Krause .......................... 235/375 |
| 4,135,663 A | 1/1979 | Nojiri et al. ................... 235/463 |
| 4,244,582 A | 1/1981 | Raees et al. .................... 273/293 |
| 4,283,708 A | 8/1981 | Lee ........................ 340/146.3 Z |
| 4,339,798 A | 7/1982 | Hedges et al. ................. 364/412 |
| 4,373,726 A | 2/1983 | Churchill et al. ......... 273/138 A |

(Continued)

FOREIGN PATENT DOCUMENTS

| CA | 1206173 | 6/1986 |
| DE | 3807 127 A1 | 9/1989 |

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — David L Lewis
*Assistant Examiner* — Ross Williams
(74) *Attorney, Agent, or Firm* — Frank Abramonte; Fearon Brown; Marvin Hein

(57) ABSTRACT

Systems, methods, and devices may be capable of allowing a player to purchase an instance of game play at a game system with a pre-paid ticket or with another item of value. The game system may determine a denomination of a unit of a currency and generate a session request indicative of the denomination. The game system may also determine a ticket code of a ticket and generate a session request indicative of the ticket code. A remote authorizer may provide the game system with game authorization indicative of a number of entertainment credits in response to receiving a session request.

16 Claims, 12 Drawing Sheets

(56) References Cited

U.S. PATENT DOCUMENTS

| | | | | |
|---|---|---|---|---|
| 4,448,419 | A | 5/1984 | Telnaes | 273/143 R |
| 4,470,496 | A | 9/1984 | Steiner | 194/4 C |
| 4,475,564 | A | 10/1984 | Koester et al. | 133/8 R |
| 4,482,058 | A | 11/1984 | Steiner | 209/534 |
| 4,503,963 | A | 3/1985 | Steiner | 194/4 C |
| 4,518,001 | A | 5/1985 | Branham | 133/5 R |
| 4,534,562 | A | 8/1985 | Cuff et al. | 273/149 P |
| 4,574,824 | A | 3/1986 | Paulsen et al. | 133/4 R |
| 4,588,292 | A | 5/1986 | Collins | 356/71 |
| 4,592,377 | A | 6/1986 | Paulsen et al. | 133/5 R |
| 4,636,846 | A | 1/1987 | Villarreal | 358/100 |
| 4,650,057 | A | 3/1987 | Koester | 194/346 |
| 4,662,637 | A | 5/1987 | Pfeiffer | 273/149 P |
| 4,667,959 | A | 5/1987 | Pfeiffer et al. | 273/149 R |
| 4,693,480 | A | 9/1987 | Smith | 273/296 |
| 4,725,079 | A | 2/1988 | Koza et al. | 283/73 |
| 4,802,218 | A | 1/1989 | Wright et al. | 380/23 |
| 4,832,341 | A | 5/1989 | Muller et al. | 273/139 |
| 4,885,700 | A | 12/1989 | Kondziolka et al. | 364/519 |
| 4,889,367 | A | 12/1989 | Miller | 283/88 |
| 4,926,996 | A | 5/1990 | Eglise et al. | 194/212 |
| 4,951,950 | A | 8/1990 | Normand et al. | 273/149 P |
| 4,973,851 | A | 11/1990 | Lee | 250/556 |
| 4,978,322 | A | 12/1990 | Paulsen | 453/57 |
| 4,995,615 | A | 2/1991 | Cheng | 273/292 |
| 5,053,612 | A | 10/1991 | Pielemeier et al. | 235/462 |
| 5,067,713 | A | 11/1991 | Soules et al. | 273/149 P |
| 5,110,134 | A | 5/1992 | Laughlin et al. | 273/293 |
| 5,121,921 | A | 6/1992 | Friedman et al. | 273/149 P |
| 5,156,397 | A | 10/1992 | Valenza, Jr. | 273/138 A |
| 5,157,602 | A | 10/1992 | Fields et al. | 364/412 |
| 5,167,411 | A | 12/1992 | Isobe | 271/273 |
| 5,167,571 | A | 12/1992 | Waller | 453/29 |
| 5,179,517 | A | 1/1993 | Sarbin et al. | 364/410 |
| 5,199,710 | A | 4/1993 | Lamle | 273/149 R |
| 5,216,234 | A | 6/1993 | Bell | 235/494 |
| 5,242,041 | A | 9/1993 | Isobe | 194/207 |
| 5,259,907 | A | 11/1993 | Soules et al. | 156/277 |
| 5,265,874 | A | 11/1993 | Dickinson et al. | 273/138 A |
| 5,273,281 | A | 12/1993 | Lovell | 273/138 R |
| 5,275,400 | A | 1/1994 | Weingardt et al. | 273/85 CP |
| 5,283,422 | A | 2/1994 | Storch et al. | 235/375 |
| 5,319,181 | A | 6/1994 | Shellhammer et al. | 235/462 |
| 5,321,241 | A | 6/1994 | Craine | 235/380 |
| 5,343,028 | A | 8/1994 | Figarella et al. | 235/462 |
| 5,381,019 | A | 1/1995 | Sato | 250/556 |
| 5,397,125 | A | 3/1995 | Adams | 273/138 A |
| 5,397,133 | A | 3/1995 | Penzias | 273/439 |
| 5,420,406 | A | 5/1995 | Izawa et al. | 235/379 |
| 5,435,778 | A | 7/1995 | Castle et al. | 453/32 |
| 5,487,544 | A | 1/1996 | Clapper, Jr. | 273/138 A |
| 5,493,613 | A | 2/1996 | Denno et al. | 380/24 |
| 5,494,144 | A | 2/1996 | Izawa | 194/203 |
| 5,505,461 | A | 4/1996 | Bell et al. | 273/433 |
| 5,511,784 | A | 4/1996 | Furry et al. | 273/143 R |
| 5,518,249 | A | 5/1996 | Sines et al. | 273/304 |
| 5,531,640 | A | 7/1996 | Inoue | 453/17 |
| 5,548,110 | A | 8/1996 | Storch et al. | 235/472 |
| 5,559,312 | A | 9/1996 | Lucero | 235/380 |
| 5,595,538 | A | 1/1997 | Haste, III | 463/17 |
| 5,605,504 | A | 2/1997 | Huang | 463/22 |
| 5,613,680 | A | 3/1997 | Groves et al. | 273/138.2 |
| 5,615,280 | A | 3/1997 | Izawa et al. | 382/135 |
| 5,655,961 | A | 8/1997 | Acres et al. | 463/27 |
| 5,669,816 | A | 9/1997 | Garczynski et al. | 463/12 |
| 5,676,231 | A | 10/1997 | Legras et al. | 194/206 |
| 5,711,525 | A | 1/1998 | Breeding | 273/292 |
| 5,737,418 | A | 4/1998 | Saffari et al. | 380/9 |
| 5,766,074 | A | 6/1998 | Cannon et al. | 463/16 |
| 5,769,458 | A | 6/1998 | Carides et al. | 283/102 |
| 5,770,533 | A | 6/1998 | Franchi | 463/42 |
| 5,779,545 | A | 7/1998 | Berg et al. | 463/22 |
| 5,780,831 | A | 7/1998 | Seo et al. | 235/462 |
| 5,788,573 | A | 8/1998 | Baerlocher et al. | 463/16 |
| 5,791,988 | A | 8/1998 | Nomi | 463/11 |
| 5,800,268 | A | 9/1998 | Molnick | 463/40 |
| 5,803,809 | A | 9/1998 | Yoseloff | 463/13 |
| 5,813,912 | A | 9/1998 | Shultz | 463/25 |
| 5,823,534 | A | 10/1998 | Banyai | 273/269 |
| 5,830,064 | A | 11/1998 | Bradish et al. | 463/22 |
| 5,830,067 | A | 11/1998 | Graves et al. | 463/40 |
| 5,836,435 | A | 11/1998 | Fujita et al. | 194/206 |
| 5,842,921 | A | 12/1998 | Mindes et al. | 463/16 |
| 5,851,149 | A | 12/1998 | Xidos et al. | 463/42 |
| 5,863,249 | A | 1/1999 | Inoue | 463/20 |
| 5,867,586 | A | 2/1999 | Liang | 382/112 |
| 5,871,400 | A | 2/1999 | Yfantis | 463/22 |
| 5,902,983 | A | 5/1999 | Crevelt et al. | 235/380 |
| 5,903,874 | A | 5/1999 | Leonard et al. | 705/14 |
| 5,910,044 | A | 6/1999 | Luciano, Jr. et al. | 453/32 |
| 5,919,091 | A | 7/1999 | Bell et al. | 463/25 |
| 5,931,731 | A | 8/1999 | Chwalisz | 453/32 |
| 5,941,771 | A | 8/1999 | Haste, III | 463/17 |
| 5,967,893 | A | 10/1999 | Lawrence et al. | 463/10 |
| 5,989,122 | A | 11/1999 | Roblejo | 463/22 |
| 5,999,808 | A | 12/1999 | LaDue | 455/412 |
| 6,003,651 | A | 12/1999 | Waller et al. | 194/202 |
| 6,010,404 | A | 1/2000 | Walker et al. | 463/21 |
| 6,019,210 | A | 2/2000 | Matsunaga et al. | 194/206 |
| 6,042,150 | A | 3/2000 | Daley | 283/86 |
| 6,048,269 | A | 4/2000 | Burns et al. | 463/25 |
| 6,062,481 | A | 5/2000 | Storch et al. | 235/494 |
| 6,062,981 | A | 5/2000 | Luciano, Jr. | 463/26 |
| 6,066,439 | A | 5/2000 | Nohr et al. | 430/347 |
| 6,068,552 | A | 5/2000 | Walker et al. | 463/21 |
| 6,083,105 | A | 7/2000 | Ronin et al. | 463/17 |
| 6,098,837 | A | 8/2000 | Izawa et al. | 221/154 |
| 6,105,747 | A | 8/2000 | Uemizo et al. | 194/203 |
| 6,117,009 | A | 9/2000 | Yoseloff | 463/20 |
| 6,120,588 | A | 9/2000 | Jacobson | 106/31.16 |
| 6,125,195 | A | 9/2000 | Ohya et al. | 382/135 |
| 6,145,838 | A | 11/2000 | White | 273/295 |
| 6,149,154 | A | 11/2000 | Grauzer et al. | 273/149 R |
| 6,152,822 | A | 11/2000 | Herbert | 463/22 |
| 6,159,096 | A | 12/2000 | Yoseloff | 463/20 |
| 6,168,513 | B1 | 1/2001 | Souza et al. | 453/57 |
| 6,179,110 | B1 | 1/2001 | Ohkawa et al. | 194/203 |
| 6,186,892 | B1 | 2/2001 | Frank et al. | 463/19 |
| 6,190,256 | B1 | 2/2001 | Walker et al. | 463/25 |
| 6,193,607 | B1 | 2/2001 | Kay | 463/22 |
| 6,196,547 | B1 | 3/2001 | Pascal et al. | 273/292 |
| 6,220,954 | B1 | 4/2001 | Nguyen et al. | 453/57 |
| 6,227,972 | B1 | 5/2001 | Walker et al. | 463/25 |
| 6,234,898 | B1 | 5/2001 | Belamant et al. | 463/25 |
| 6,244,958 | B1 | 6/2001 | Acres | 463/26 |
| 6,264,109 | B1 | 7/2001 | Chapet et al. | 235/492 |
| 6,283,856 | B1 | 9/2001 | Mothwurf | 463/17 |
| 6,312,334 | B1 | 11/2001 | Yoseloff | 463/25 |
| 6,315,664 | B1 | 11/2001 | Baerlocher et al. | 463/21 |
| 6,347,738 | B1 | 2/2002 | Crevelt et al. | 235/380 |
| 6,350,193 | B1 | 2/2002 | Paulsen | 453/57 |
| 6,352,261 | B1 | 3/2002 | Brown | 273/288 |
| 6,371,482 | B1 | 4/2002 | Hall, Jr. | 273/138.1 |
| 6,394,902 | B1 | 5/2002 | Glavich et al. | 463/20 |
| 6,394,907 | B1 | 5/2002 | Rowe | 463/42 |
| 6,406,369 | B1 | 6/2002 | Baerlocher et al. | 463/20 |
| 6,409,602 | B1 | 6/2002 | Wiltshire et al. | 463/42 |
| 6,413,162 | B1 | 7/2002 | Baerlocher et al. | 463/20 |
| 6,425,824 | B1 | 7/2002 | Baerlocher et al. | 463/16 |
| 6,460,848 | B1 | 10/2002 | Soltys et al. | 273/149 R |
| 6,464,581 | B1 | 10/2002 | Yoseloff | 463/20 |
| 6,464,584 | B2 | 10/2002 | Oliver | 463/25 |
| 6,468,155 | B1 | 10/2002 | Zucker et al. | 463/23 |
| 6,468,156 | B1 | 10/2002 | Hughs-Baird et al. | 463/25 |
| 6,471,208 | B2 | 10/2002 | Yoseloff et al. | 273/143 R |
| 6,478,676 | B1 | 11/2002 | Dayan | 463/17 |
| 6,505,772 | B1 | 1/2003 | Mollett et al. | 235/379 |
| 6,508,709 | B1 | 1/2003 | Karmarkar | 463/42 |
| 6,517,435 | B2 | 2/2003 | Soltys et al. | 463/25 |
| 6,517,436 | B2 | 2/2003 | Soltys et al. | 463/29 |
| 6,517,437 | B1 | 2/2003 | Wells et al. | 463/30 |
| 6,520,856 | B1 | 2/2003 | Walker et al. | 463/21 |
| 6,520,857 | B2 | 2/2003 | Soltys et al. | 463/29 |
| 6,527,271 | B2 | 3/2003 | Soltys et al. | 273/148 R |

(56) References Cited

U.S. PATENT DOCUMENTS

| | | | |
|---|---|---|---|
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,547,131 B1 | 4/2003 | Foodman et al. | 235/380 |
| 6,575,834 B1 | 6/2003 | Lindo | 463/40 |
| 6,578,847 B1 | 6/2003 | Hedrick et al. | 273/138.2 |
| 6,579,179 B2 | 6/2003 | Poole et al. | 463/25 |
| 6,579,180 B2 | 6/2003 | Soltys et al. | 463/25 |
| 6,579,181 B2 | 6/2003 | Soltys et al. | 463/25 |
| 6,585,598 B2 | 7/2003 | Nguyen et al. | 463/41 |
| 6,595,857 B2 | 7/2003 | Soltys et al. | 463/29 |
| 6,599,185 B1 | 7/2003 | Kaminkow et al. | 463/16 |
| 6,607,441 B1 | 8/2003 | Acres | 463/25 |
| 6,612,928 B1 | 9/2003 | Bradford et al. | 463/29 |
| 6,620,047 B1 | 9/2003 | Alcorn et al. | 463/37 |
| 6,629,591 B1 | 10/2003 | Griswold et al. | 194/205 |
| 6,638,161 B2 | 10/2003 | Soltys et al. | 463/12 |
| 6,652,379 B2 | 11/2003 | Soltys et al. | 463/22 |
| 6,655,684 B2 | 12/2003 | Grauzer et al. | 273/149 R |
| 6,656,048 B2 | 12/2003 | Olsen | 463/25 |
| 6,663,490 B2 | 12/2003 | Soltys et al. | 463/25 |
| 6,676,516 B2 | 1/2004 | Baerlocher et al. | 463/25 |
| 6,676,522 B2 | 1/2004 | Rowe et al. | 463/42 |
| 6,682,421 B1 | 1/2004 | Rowe et al. | 463/25 |
| 6,685,568 B2 | 2/2004 | Soltys et al. | 463/47 |
| 6,688,979 B2 | 2/2004 | Soltys et al. | 463/25 |
| 6,698,759 B2 | 3/2004 | Webb et al. | 273/292 |
| 6,702,291 B2 | 3/2004 | Grebler et al. | 273/292 |
| 6,709,324 B1 | 3/2004 | Beadell | 453/29 |
| 6,712,693 B1 | 3/2004 | Hettinger | 463/20 |
| 6,712,696 B2 | 3/2004 | Soltys et al. | 463/25 |
| 6,729,961 B1 | 5/2004 | Millerschone | 463/30 |
| 6,736,250 B2 | 5/2004 | Mattice | 194/203 |
| 6,739,975 B2 | 5/2004 | Nguyen et al. | 463/39 |
| 6,746,330 B2 | 6/2004 | Cannon | 463/25 |
| 6,749,515 B2 | 6/2004 | Hedrick et al. | 463/46 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,486 B1 | 11/2004 | Luciano, Jr. | 463/24 |
| 6,837,789 B2 | 1/2005 | Garahi et al. | 463/29 |
| 6,857,961 B2 | 2/2005 | Soltys et al. | 463/47 |
| 6,866,586 B2 | 3/2005 | Oberberger et al. | 463/42 |
| 6,874,681 B1 | 4/2005 | Izawa et al. | 235/379 |
| 6,896,618 B2 | 5/2005 | Benoy et al. | 463/25 |
| 6,905,411 B2 | 6/2005 | Nguyen et al. | 463/25 |
| 6,964,612 B2 | 11/2005 | Soltys et al. | 463/47 |
| 6,971,956 B2 | 12/2005 | Rowe et al. | 463/25 |
| 6,991,540 B2 | 1/2006 | Marlow | 463/16 |
| 6,991,544 B2 | 1/2006 | Soltys et al. | 463/42 |
| 7,011,309 B2 | 3/2006 | Soltys et al. | 273/149 R |
| 7,035,626 B1 | 4/2006 | Luciano, Jr. | 455/414.1 |
| 7,063,617 B2 | 6/2006 | Brosnan et al. | 463/25 |
| 7,073,791 B2 | 7/2006 | Grauzer et al. | 273/149 R |
| 7,077,332 B2 | 7/2006 | Verschuur et al. | 235/492 |
| 7,086,947 B2 | 8/2006 | Walker et al. | 463/25 |
| 7,099,035 B2 | 8/2006 | Brooks et al. | 358/1.15 |
| 7,222,852 B2 | 5/2007 | Soltys et al. | 273/148 R |
| 7,291,068 B2 | 11/2007 | Bryant et al. | 463/25 |
| 7,303,475 B2 | 12/2007 | Britt et al. | 463/42 |
| 7,309,065 B2 | 12/2007 | Yoseloff et al. | 273/292 |
| 7,331,520 B2 * | 2/2008 | Silva et al. | 235/381 |
| 7,364,510 B2 | 4/2008 | Walker et al. | 463/42 |
| 7,390,256 B2 | 6/2008 | Soltys et al. | 463/12 |
| 7,419,428 B2 | 9/2008 | Rowe | 463/25 |
| 7,427,233 B2 | 9/2008 | Walker et al. | 463/16 |
| 7,427,234 B2 | 9/2008 | Soltys et al. | 463/16 |
| 7,427,236 B2 | 9/2008 | Kaminkow et al. | 463/26 |
| 7,434,805 B2 | 10/2008 | Grauzer et al. | 273/149 R |
| 7,448,626 B2 | 11/2008 | Fleckenstein | 273/149 R |
| 7,500,915 B2 | 3/2009 | Wolf et al. | 463/27 |
| 7,510,186 B2 | 3/2009 | Fleckenstein | 273/149 R |
| 7,510,194 B2 | 3/2009 | Soltys et al. | 273/293 |
| 7,510,474 B2 | 3/2009 | Carter, Sr. | 463/29 |
| 7,534,169 B2 | 5/2009 | Amaitis et al. | 463/39 |
| 7,537,216 B2 | 5/2009 | Soltys et al. | 273/149 P |
| 7,559,839 B2 | 7/2009 | Bahar | 463/25 |
| 7,575,234 B2 | 8/2009 | Soltys et al. | 273/149 R |
| 7,585,217 B2 | 9/2009 | Lutnick et al. | 463/16 |
| 7,617,151 B2 | 11/2009 | Rowe | 705/39 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,686,681 B2 | 3/2010 | Soltys et al. | 463/11 |
| 7,690,995 B2 | 4/2010 | Frankulin et al. | 463/41 |
| 7,736,223 B2 | 6/2010 | Pace | 463/19 |
| 7,753,781 B2 | 7/2010 | Storch | 463/25 |
| 7,753,789 B2 | 7/2010 | Walker et al. | 463/42 |
| 7,775,868 B2 | 8/2010 | Toyoda | 463/12 |
| 7,780,526 B2 | 8/2010 | Nguyen et al. | 463/29 |
| 7,850,528 B2 | 12/2010 | Wells | 463/42 |
| 7,901,294 B2 | 3/2011 | Walker et al. | 463/42 |
| 7,903,863 B2 | 3/2011 | Jones et al. | 382/135 |
| 2002/0111213 A1 | 8/2002 | McEntee et al. | 463/42 |
| 2002/0113371 A1 | 8/2002 | Snow | 273/292 |
| 2002/0142825 A1 | 10/2002 | Lark et al. | 463/16 |
| 2003/0004871 A1 | 1/2003 | Rowe | 705/39 |
| 2003/0032474 A1 | 2/2003 | Kaminkow | 463/25 |
| 2003/0042679 A1 | 3/2003 | Snow | 273/292 |
| 2003/0078789 A1 | 4/2003 | Oren | 705/1 |
| 2003/0090064 A1 | 5/2003 | Hoyt et al. | 273/292 |
| 2003/0104865 A1 | 6/2003 | Itkis et al. | 463/39 |
| 2003/0186739 A1 | 10/2003 | Paulsen et al. | 463/25 |
| 2003/0232651 A1 | 12/2003 | Huard et al. | 463/42 |
| 2004/0002379 A1 | 1/2004 | Parrott et al. | 463/29 |
| 2004/0005920 A1 | 1/2004 | Soltys et al. | 463/25 |
| 2004/0028266 A1 * | 2/2004 | Jones et al. | 382/135 |
| 2004/0029635 A1 | 2/2004 | Giobbi | 463/30 |
| 2004/0033095 A1 | 2/2004 | Saffari et al. | 400/120.01 |
| 2004/0043815 A1 | 3/2004 | Kaminkow | 463/25 |
| 2004/0087375 A1 | 5/2004 | Gelinotte | 463/47 |
| 2004/0127291 A1 | 7/2004 | George et al. | 463/42 |
| 2004/0132529 A1 | 7/2004 | Mkrtchyan et al. | 463/29 |
| 2004/0142744 A1 | 7/2004 | Atkinson et al. | 463/29 |
| 2004/0150702 A1 | 8/2004 | Tsuyoshi et al. | 347/100 |
| 2004/0166918 A1 | 8/2004 | Walker et al. | 463/16 |
| 2004/0224777 A1 | 11/2004 | Smith et al. | 463/47 |
| 2004/0259618 A1 | 12/2004 | Soltys et al. | 463/11 |
| 2005/0043094 A1 | 2/2005 | Nguyen et al. | 463/42 |
| 2005/0054438 A1 | 3/2005 | Rothschild et al. | 463/29 |
| 2005/0055113 A1 | 3/2005 | Gauselmann | 700/91 |
| 2005/0059479 A1 | 3/2005 | Soltys et al. | 463/25 |
| 2005/0060055 A1 * | 3/2005 | Hallowell et al. | 700/95 |
| 2005/0070358 A1 | 3/2005 | Angell et al. | 463/39 |
| 2005/0101367 A1 | 5/2005 | Soltys et al. | 463/12 |
| 2005/0116417 A1 | 6/2005 | Soltys et al. | 273/292 |
| 2005/0121852 A1 | 6/2005 | Soltys et al. | 273/149 P |
| 2005/0124411 A1 | 6/2005 | Schneider et al. | 463/29 |
| 2005/0137005 A1 | 6/2005 | Soltys et al. | 463/13 |
| 2005/0143166 A1 | 6/2005 | Walker et al. | 463/25 |
| 2005/0146094 A1 | 7/2005 | Soltys et al. | 273/292 |
| 2005/0156318 A1 | 7/2005 | Douglas | 257/761 |
| 2005/0176507 A1 | 8/2005 | Ephrati | 463/39 |
| 2005/0181856 A1 | 8/2005 | Cannon et al. | 463/16 |
| 2005/0181864 A1 | 8/2005 | Britt et al. | 463/25 |
| 2005/0206078 A1 | 9/2005 | Soltys et al. | 273/149 R |
| 2005/0215311 A1 | 9/2005 | Hornik et al. | 463/20 |
| 2005/0221882 A1 | 10/2005 | Nguyen et al. | 463/16 |
| 2005/0227760 A1 | 10/2005 | Vlazny et al. | 463/28 |
| 2005/0239542 A1 | 10/2005 | Olsen | 463/27 |
| 2005/0266919 A1 | 12/2005 | Rowe et al. | 463/25 |
| 2005/0282614 A1 | 12/2005 | Gauselmann | 463/20 |
| 2005/0282626 A1 | 12/2005 | Manfredi et al. | 463/25 |
| 2006/0009282 A1 | 1/2006 | George et al. | 463/29 |
| 2006/0019745 A1 | 1/2006 | Benbrahim | 463/29 |
| 2006/0035707 A1 | 2/2006 | Nguyen et al. | 463/29 |
| 2006/0046849 A1 | 3/2006 | Kovacs | 463/39 |
| 2006/0121970 A1 | 6/2006 | Khal | 463/16 |
| 2006/0183541 A1 | 8/2006 | Okada et al. | 463/29 |
| 2006/0205508 A1 | 9/2006 | Green | 463/40 |

(56) References Cited

U.S. PATENT DOCUMENTS

| | | |
|---|---|---|
| 2006/0205519 A1 | 9/2006 | Soltys .................... 463/47 |
| 2006/0247013 A1 | 11/2006 | Walker et al. ............. 463/20 |
| 2006/0287077 A1 | 12/2006 | Grav et al. ............... 463/27 |
| 2007/0004500 A1 | 1/2007 | Soltys et al. .............. 463/22 |
| 2007/0015583 A1 | 1/2007 | Tran ...................... 463/40 |
| 2007/0054725 A1 | 3/2007 | Morrow et al. ............ 463/16 |
| 2007/0057453 A1 | 3/2007 | Soltys et al. ............. 273/149 P |
| 2007/0057454 A1 | 3/2007 | Fleckenstein ............. 273/149 R |
| 2007/0057462 A1 | 3/2007 | Fleckenstein ............. 273/274 |
| 2007/0057466 A1 | 3/2007 | Soltys et al. ............. 273/292 |
| 2007/0060259 A1 | 3/2007 | Pececnik .................. 463/16 |
| 2007/0060260 A1 | 3/2007 | Fleckenstein ............. 463/16 |
| 2007/0060307 A1 | 3/2007 | Mathis et al. ............. 463/25 |
| 2007/0060365 A1 | 3/2007 | Tien et al. ............... 463/42 |
| 2007/0077990 A1 | 4/2007 | Cuddy et al. ............. 463/25 |
| 2007/0093298 A1 | 4/2007 | Brunet .................... 463/42 |
| 2007/0111775 A1 | 5/2007 | Yoseloff .................. 463/16 |
| 2007/0117608 A1 | 5/2007 | Roper et al. ............. 463/16 |
| 2007/0167235 A1 | 7/2007 | Naicker ................... 463/42 |
| 2007/0168251 A1 | 7/2007 | Hilbert et al. ............ 705/14 |
| 2007/0198418 A1 | 8/2007 | MacDonald et al. ........ 705/52 |
| 2007/0208816 A1 | 9/2007 | Baldwin et al. ........... 709/206 |
| 2007/0235521 A1 | 10/2007 | Mateen et al. ............ 235/379 |
| 2007/0241497 A1 | 10/2007 | Soltys et al. ............. 273/149 R |
| 2007/0241498 A1 | 10/2007 | Soltys .................... 273/149 R |
| 2007/0243925 A1 | 10/2007 | LeMay et al. ............. 463/20 |
| 2007/0243927 A1 | 10/2007 | Soltys .................... 463/25 |
| 2007/0243935 A1 | 10/2007 | Huizinga .................. 463/42 |
| 2007/0259709 A1 | 11/2007 | Kelly et al. .............. 463/20 |
| 2007/0259711 A1 | 11/2007 | Thomas ................... 463/22 |
| 2007/0287534 A1 | 12/2007 | Fleckenstein ............. 463/29 |
| 2007/0287535 A1 | 12/2007 | Soltys .................... 463/29 |
| 2007/0298865 A1 | 12/2007 | Soltys .................... 463/22 |
| 2007/0298868 A1 | 12/2007 | Soltys .................... 463/25 |
| 2008/0004108 A1 | 1/2008 | Klinkhammer .............. 463/29 |
| 2008/0009344 A1 | 1/2008 | Graham et al. ............ 463/25 |
| 2008/0026832 A1 | 1/2008 | Stevens et al. ........... 463/26 |
| 2008/0026848 A1 | 1/2008 | Byng ...................... 463/42 |
| 2008/0038035 A1 | 2/2008 | Shuldman et al. .......... 400/76 |
| 2008/0045341 A1 | 2/2008 | Englman .................. 463/42 |
| 2008/0045344 A1 | 2/2008 | Schlottmann et al. ....... 463/25 |
| 2008/0076572 A1 | 3/2008 | Nguyen et al. ............ 463/42 |
| 2008/0090651 A1 | 4/2008 | Baerlocher ............... 463/27 |
| 2008/0096659 A1 | 4/2008 | Kreloff et al. ........... 463/39 |
| 2008/0113764 A1 | 5/2008 | Soltys .................... 463/22 |
| 2008/0113773 A1 | 5/2008 | Johnson et al. ........... 463/25 |
| 2008/0113781 A1 | 5/2008 | Soltys et al. ............. 463/28 |
| 2008/0119284 A1 | 5/2008 | Luciano, Jr. et al. ...... 463/42 |
| 2008/0146337 A1 | 6/2008 | Halonen et al. ........... 463/42 |
| 2008/0261701 A1 | 10/2008 | Lewin et al. ............. 463/43 |
| 2008/0311971 A1 | 12/2008 | Dean ...................... 463/20 |
| 2009/0005176 A1 | 1/2009 | Morrow et al. ............ 463/43 |
| 2009/0011833 A1 | 1/2009 | Seelig et al. ............ 463/42 |
| 2009/0115133 A1 | 5/2009 | Kelly et al. .............. 273/274 |
| 2009/0117994 A1 | 5/2009 | Kelly et al. .............. 463/25 |
| 2009/0118001 A1 | 5/2009 | Kelly et al. .............. 463/29 |
| 2009/0118005 A1 | 5/2009 | Kelly et al. .............. 463/31 |
| 2009/0163279 A1 | 6/2009 | Hermansen et al. ......... 463/42 |
| 2009/0176556 A1 | 7/2009 | Gagner et al. ............ 463/25 |
| 2009/0253483 A1 | 10/2009 | Pacey et al. ............. 463/20 |
| 2009/0270170 A1 | 10/2009 | Patton .................... 463/36 |
| 2009/0275374 A1 | 11/2009 | Nelson et al. ............ 463/16 |
| 2009/0275393 A1 | 11/2009 | Kisenwether et al. ....... 463/25 |
| 2009/0275398 A1 | 11/2009 | Nelson .................... 463/27 |
| 2009/0275399 A1 | 11/2009 | Kelly et al. .............. 463/27 |
| 2009/0275402 A1 | 11/2009 | Backover et al. .......... 463/29 |
| 2009/0275411 A1 | 11/2009 | Kisenwether et al. ....... 463/42 |
| 2009/0276715 A1 | 11/2009 | Arbogast et al. .......... 715/736 |
| 2009/0307069 A1 | 12/2009 | Meyerhofer ............... 705/14.12 |
| 2010/0016068 A1 | 1/2010 | White et al. ............. 463/25 |
| 2010/0125851 A1 | 5/2010 | Singh et al. ............. 718/104 |
| 2010/0130280 A1 | 5/2010 | Arezina et al. ........... 463/20 |
| 2011/0009184 A1 | 1/2011 | Byng ...................... 463/20 |

FOREIGN PATENT DOCUMENTS

| | | |
|---|---|---|
| DE | 44 39 502 C1 | 9/1995 |
| EP | 0 327 069 A2 | 8/1989 |
| EP | 0 790 848 B1 | 8/1997 |
| EP | 0 700 980 B1 | 11/1999 |
| EP | 1 291 045 A2 | 3/2003 |
| GB | 2 370 791 A | 7/2002 |
| JP | 8255059 | 10/1996 |
| KR | 2002-0061793 | 7/2002 |
| WO | 96/14115 | 5/1996 |
| WO | 02/05914 A1 | 1/2002 |
| WO | 02/051512 A2 | 7/2002 |
| WO | 03/004116 A1 | 1/2003 |
| WO | 2005/035084 | 4/2005 |
| WO | 2006/110348 | 10/2006 |

OTHER PUBLICATIONS

Bally TMS, "MP21—Automated Table Tracking/Features," 2 pages, Nov. 2005.

Bally TMS, "MPBacc6—Specifications/Specifications," 2 pages, Nov. 2005.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

Humble, L., *The World's Greatest Blackjack Book*, Random House, Inc., New York, 1987, p. 182.

Plaintiff's Declaration of Lawrence Luciano in Opposition to Shuffle Master's Motion for Preliminary Injunction, *Card, LLC v. Shuffle Master, Inc.*, D. Nev. (No. CV-N-03-0244-ECR-(RAM)), Nov. 24, 2003.

Scarne, J., *Scarne's Encyclopedia of Games*, Harper & Row, New York, 1973, p. 153.

Scarne, J., *Scarne's New Complete Guide to Gambling*, Simon & Schuster, Inc., New York, 1974, pp. 358-359.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

\* cited by examiner

SYSTEMS, METHODS, AND DEVICES FOR PROVIDING PURCHASES OF INSTANCES OF GAME PLAY AT A HYBRID TICKET/CURRENCY GAME MACHINE

BACKGROUND

1. Technical Field

This disclosure generally relates to systems allowing ticket based purchases and more particularly to game-entertainment systems allowing both ticket based purchases and units of currency based purchases.

2. Description of the Related Art

A game-entertainment system such as a casino or other entertainment establishment may have various game machines that are configured to provide an instance of game play when a player inserts a ticket into the game machine. A ticket normally has a ticket identifier and may be associated with a nominal amount of credit or money. A central computer/server may have a data base of ticket account records, where a ticket account is associated with one ticket. The ticket account record includes a number of credits that may be used to purchase an instance of game play at a game machine and/or redeemed for a monetary amount.

When a player redeems a ticket in a game machine, the game machine reads the ticket identifier and sends information indicative of the ticket identifier to the central computer/server. The central computer/server determines the number of credits associated with the ticket, and provides the game machine with an indication of the number of credits associated with the ticket. If the number of credits associated with the ticket is sufficient for purchasing an instance of game play, the game machine allows the player to purchase an instance of game play. If the number of credits associated with the ticket is not sufficient for purchasing an instance of game play, the game machine prevents the player from purchasing an instance of game play until the player redeems a sufficient number of tickets.

Some game machines are ticket-only game machines. These game machines are configured to allow a player to purchase an instance of game play only when the player makes the purchase with a ticket. These machines may include software, firmware, or hardware that prevents the player from making a purchase of an instance of game with any instrument other than a ticket.

There is a need for systems, methods, and devices that allow a player to make a purchase of an instance of game with a ticket and with other instruments such as units of a currency and/or financial media such as credit cards, debit cards, gift cards, smart cards, etc.

BRIEF SUMMARY

In one aspect, a game system communicatively coupled to a game-session authorizer that provides account information indicative of a number of entertainment credits based at least on one received valid item of value includes: an item of value receiver configured to receive a purported item of value, the purported item of value being one of a unit of a currency or a ticket; and a validator configured to receive the purported item of value from the validator and operable to determine whether the purported item of value is a valid or invalid item of value for the purpose of purchasing the session of game play. The validator is operable to determine whether the validated item of value is a respective ticket or a respective unit of a respective currency and operable to provide a ticket code indicative of unique ticket identification information for the respective ticket if the validated item of value is the respective ticket, wherein the ticket code is formatted in accordance with a defined format, and operable to provide currency information indicative of a denomination of the respective unit of a respective currency if the validated item of value is the respective unit of a respective currency. A pseudo ticket code generator communicatively coupled to the validator and operable to generate a pseudo ticket code indicative of the denomination of the unit of a respective currency based at least on the currency information, wherein the pseudo ticket code is formatted in accordance with the defined format of the ticket code. The game system may further include: a session requester communicatively coupled to the validator and the pseudo ticket code generator and operable to generate a game-session request carrying the ticket code if the validated item of value is the respective ticket and carrying the pseudo ticket code if the validated item of value is different from the respective ticket; and a game controller configured to receive a session authorization indicative of a number of available entertainment credits and operable to provide a first instance game play if, and only if, the number of available entertainment credits indicated by the session authorization is above a threshold.

In one aspect, a game system communicatively coupled to a game-session authorizer that provides account information indicative of a number of entertainment credits based at least on one received valid item of value includes: means for validating a purported item of value as being one of a valid ticket having a ticket identifier indicative of a ticket code or a unit of a currency having a denomination, the means for validating a purported item of value configured to provide the ticket code if the purported item of value is a respective valid ticket and configured to provide currency information indicative of at least the denomination if the purported item of value is a respective valid unit of a respective currency; means for generating a pseudo ticket code indicative of the denomination of the respective unit of a respective currency based at least on the currency information; means for generating a session request having a defined format based at least on one of the ticket code provided by the means for validating the purported item of value or the pseudo ticket code indicative of the denomination of the respective unit of a respective currency provided by the means for generating a pseudo ticket code; means for sending a session request to a remote authorizer; means for receiving authorization indicative of a number of entertainment credits from the remote authorizer; and means for controlling access to a game configured to deny access to a game whenever the means for controlling access to a game receives information indicative of a respective unit of a respective currency being provided to purchase an instance of game play and configured to provide access to the game only upon receiving authorization indicative of a respective number of entertainment credits from the remote controller via the means for receiving authorization.

In another aspect, a method of purchasing a session of game play at a gaming machine having a game device configured to otherwise deny a respective session of game play when the game device receives information indicative of a unit of a currency being presented for the purpose of the purchase of the session of game play includes: receiving a purported item of value; determining whether the purported item of value is a valid unit of a currency, a valid ticket, or invalid for the purposes of purchasing an instance of game play at the gaming machine. If the purported item of value is the respective unit of a respective currency, the method may further include: determining a denomination of the respective unit of a respective currency; generating a first pseudo ticket code indicative of at least the denomination of the respective unit of a respective currency based at least in part on the denomination of the respective unit of a currency; providing the first pseudo ticket code indicative of at least the denomination of the respective unit of a respective currency to the request generator in a defined ticket code format. In addition, the method may further include: generating in accordance with a defined format a session request based at least on one of the ticket code or the first pseudo ticket code, wherein the session request is indicative of a ticket code if the session request is based at least on the ticket code for a ticket, and wherein the session request is indicative of the denomination of the respective unit of a respective currency if the session request is based at least on the first pseudo ticket code; sending the session request to a remote entertainment credit manager; receiving session authorization indicative of a number of entertainment credits at the remote entertainment credit manager; determining an available entertainment credit amount based at least on the received session authorization at a game controller; determining whether the available entertainment credit amount is above a threshold level at a game controller; and providing an instance of game play if, and only if, the available entertainment credit amount is above the threshold level.

Figure 1:
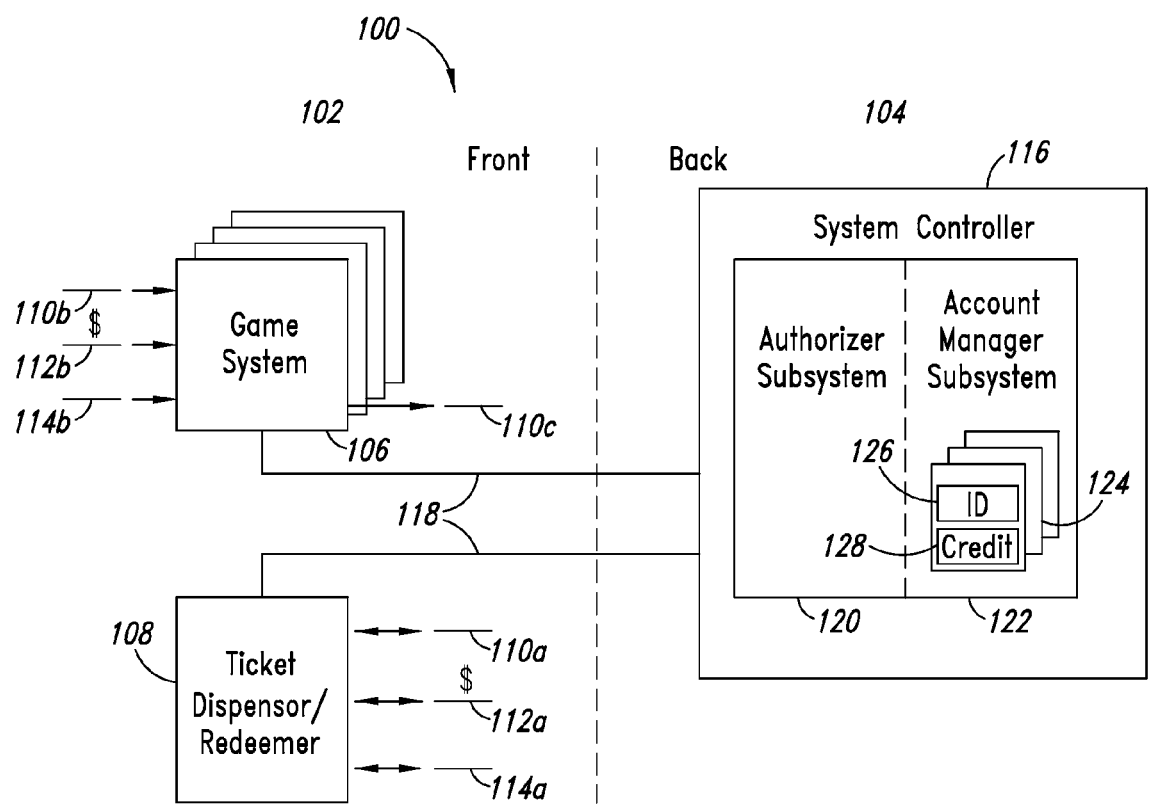
FIG. 1 is a block diagram of a game-entertainment system according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with ticket/currency validators, machine-readable symbols readers, and/or with game subsystems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive, sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions, acts. In alternative embodiments, various logical functions, steps, or acts may be executed out of order from that shown or discussed, including substantially concurrently or in reverse order, and/or manually, depending on the functionality involved, as would be understood by those reasonably skilled in the art. Certain acts in the processes or process flow described in all of the logic flow diagrams referred to below must naturally precede others to function as described. However, the various embodiments are not limited to the order of the acts described if such order or sequence does not alter the functionality of one or more of the embodiments. That is, it is recognized that some acts may be performed before, after, or in parallel with other acts. Further, some embodiments, may include additional acts and/or omit other acts.

FIG. 1 shows a game-entertainment system 100 according to one non-limiting illustrated embodiment. The game-entertainment system 100 may include various games of chance and/or of skill that may be played for entertainment and/or for monetary wagers. Games of chance may include slot machines, roulette, etc. Games of skill may include poker, blackjack, arcade games, etc. In some embodiments, the game-entertainment system 100 may provide players with the opportunity to place monetary wagers on, among other things, the outcome of a game using tickets, referenced individually as 110a, 110b, and 110c and collectively as 110, and units of a currency, referenced individually as 112a, 112b, 112c and collectively as 112. In some instances such wagers may use pretend money, that has no actual value outside of the game. Such may, for example, be used at charitable "casino night" type events.

The game-entertainment system 100 may include a front end 102 and a back end 104. The front end 102 includes game systems 106 and may include a ticket dispenser/redeemer 108. The ticket dispenser/redeemer 108 may be an automated device, kiosk, and/or a cashier's booth. A player (not shown) may purchase a ticket 110a by, among other ways, providing the ticket dispenser/redeemer 108 with a unit 112a of a currency having a first monetary value or by providing a financial medium 114a such as, but not limited to, credit card, debit card, gift card, smart card, etc.

In some embodiments, a nominal number of entertainment credits may be associated with the ticket 110a. An entertainment credit may be associated with a monetary value, and as such, the ticket 110a may be redeemable at the ticket dispenser/redeemer 108. The amount of money for which the ticket 110a may be redeemed may depend on the number of entertainment credits associated with the ticket 110a and the monetary value of an entertainment credit. In some embodiments, the ticket 110a may only be redeemable for entertainment credit and not for money such may be particularly useful where tickets are distributed as an incentive (e.g., comp).

In addition to being redeemable, an entertainment credit may be used to purchase an instance, or instances, of game play at the game systems 106 and/or other services and goods offered at the game-entertainment system 100.

The first time a player uses the game-entertainment system 100, or any time thereafter, the player may purchase the ticket 110a from the ticket dispenser/redeemer 108. After the ticket dispenser/redeemer 108 receives the unit 112a of a currency and/or the financial medium 114a, the ticket dispenser/redeemer 108 may provide a purchase request to the back end 104. The purchase request may include a purchase amount that generally corresponds to the monetary value of the unit 112a of the currency, an amount to be charged to the financial medium 114a, an aggregate of an amount to be charged to the financial medium 114a and the monetary value of the unit 112a of the currency, and/or some other amount of money. The purchase request may further include time-stamps and an indication of an identity of the terminal for example, a terminal identifier.

The game systems 106 may be of various types such as, wager game systems and non-wager game systems. Non-wager game systems include various arcade type games such as pinball, in which a player may attempt to accumulate a number of points which may, or may not, have actual value. Wager game systems may include various games such as poker, blackjack, etc. The game systems 106 may include electronic based devices where a player plays a virtual game. For example, in a game of virtual poker, virtual cards are dealt and displayed to a player, and the player may play against the game system 106. Some of the game stations 106 may be a hybrid electro-mechanical game such as a game system with electronic payment and accounting components and mechanical game components.

A player may commence a session of game play by purchasing an instance of game play from the game system 106 using a ticket 110b and/or a unit 112b of the currency and/or a financial medium 114b. In some embodiments, the player may accrue entertainment credits from an instance of game play. Some or all of the entertainment credits may be used to purchase another instance of game play during the session of game play or some or all of the entertainment credits may be saved for later redemption.

When the player has finished the session of game play, the game system 106 may provide the player with a ticket 110c. The ticket 110c may be associated a number of entertainment credits. The number of entertainment credits associated with the ticket 110c may be depend at least on a number of entertainment credits initially associated with the ticket 110b (or the monetary value of the unit 112b of the currency or the amount of funds charged-to, debited-from, financial medium 114b) and the total number of available entertainment credits saved during the session of game play.

In some embodiments, the game system 106 may return the ticket 110b to the player when the player terminates a session of game play. Information associated with the ticket 110b may be updated based at least in part on the number of instances of game play purchased during the session of game play and/or the number of entertainment credits received by the player during the session of game play.

The back end 104 may include a system controller 116 which may be communicatively coupled to the game systems 106 and to the ticket dispenser/redeemer 108 by communication links 118. The communication links 118 may be a network such as a wire, wireless, or combination thereof, network. The system controller 116 may include an authorizer subsystem 120 and an account manager subsystem 122 and may be embodied in a computing system, distributed computing system, servers, etc. The authorizer subsystem 120 is configured to respond to game session requests and to selectively grant or deny permission for a session of game play. The session request may include information indicative of a purchase amount and/or information indicative of unique ticket identification information, time-stamps and terminal identity.

The account manager subsystem 122 may include account records 124. Each one of the account records may include a unique account identifier 126 and a credit amount 128, which may generally correspond to the purchase amount and/or a number of entertainment credits. The unique account identifier 126 of a respective account record 124 may associate the respective account record 124 with one of the tickets 110a, 110b, 110c, and the credit amount 128 of the respective account record 124 may be indicative of the number of entertainment credits associated with the same ticket 110a, 110b, 110c.

In some embodiments, when a player uses the ticket 110b to purchase an instance of game play at the game system 106, the game system 106 may provide the system controller 116 with information indicative of unique ticket identification information. Based at least in part on the information indicative of unique ticket identification information, the account manager 122 may determine with which one of the account records 124 the ticket 110b is associated. The determination may also be based at least in part on the respective account identifier 126 for the accounts records 124. Having determined the account record 124 with which the ticket 110b may be associated, the account manager 122 may determine a number of entertainment credits associated with the ticket 110b based at least in part on the credit amount 128 of the respective account record 124. The system controller 116 may then provide the game system 106 with information indicative of the number of entertainment credits associated with the ticket 110b. The game system 106 may determine whether to provide an instance of game play based at least in part on the information indicative of the number of entertainment credits associated with the ticket 110b.

In some embodiments, the tickets 110 may be single-use only tickets. For example, a player may purchase the ticket 110a from the ticket dispenser/redeemer 108. An account record 124 may be created and associated with the ticket 110b. The player may commence a session of game play at one of the game systems 106 by purchasing an instance of game play with the ticket 110b. During the session of game play, the game system 106 audits entertainment credits for the player, e.g., available entertainment credits=a number of entertainment credits initially associated with the ticket 110a plus a number of available entertainment credits accrued during the session of game play minus a number of entertainment credits used to purchase instances of game play. At the end of the session of game play, the game system 106 may provide the system controller 116 with information indicative of the number of available entertainment credits and provide the player with a new ticket 110c. The new ticket 110c may be associated with a newly created account record 124. The player may take the new ticket 110c to another game system 106 to commence another session of game play or redeem the ticket 110 at the ticket dispenser/redeemer 108.

In some embodiments, the tickets 110 may be multi-use tickets. For example, a player may commence a session of game play at one of the game systems 106 by purchasing an instance of game play with the ticket 110b. During the session of game play, the game system 106 audits entertainment credits for the player, e.g., available entertainment credits=a number of entertainment credits initially associated with the ticket 110b plus a number of entertainment credits accrued during the session of game play minus a number of entertainment credits used to purchase instances of game play. At the end of the session of game play, the game system 106 may provide the system controller 116 with information indicative of the number of available entertainment credits and provide the player with the same ticket 110b. The system controller 116 may update account information based at least on the information indicative of the number of available entertainment credits. The player may take the ticket 110b to another game system 106 to commence another session of game play or redeem the ticket 110 at the ticket dispenser/redeemer 108.

In some embodiments, the account manager subsystem 122 may create an account record 124 when a player purchases the ticket 110a at the ticket dispenser/redeemer 108. The credit amount 128 of the account record 124 may be based at least in part on the purchase amount of the ticket 110a. The account manager subsystem 122 may provide the ticket dispenser/redeemer 108 with information indicative of a ticket identifier that may be associated with the newly created account record 124. Alternatively, in some embodiments, the account manager subsystem 122 may receive from the ticket dispenser/redeemer 108 information indicative of a ticket identifier or information indicative of ticket identification information that may be encoded by a ticket identifier, and the received information may be associated with the newly created account record 124.

In some embodiments, the ticket dispenser/redeemer 108 may generate ticket identification information and print a ticket identifier that encodes the ticket identification information on a surface of a ticket. In some embodiments, the ticket dispenser/redeemer 108 may receive information indicative of ticket identification information and print a ticket identifier that encodes the ticket identification information on a surface of a ticket. In some embodiments, the ticket dispenser/redeemer 108 may provide the system controller 116 with information indicative of ticket identification information.

In some embodiments, the account manager subsystem 122 may create an account record 124 when a player purchases an instance of game play at the game system 106 with an item of value that is not a ticket 110. The credit amount 128 of the newly created account record 124 may be based at least in part on the monetary value of the unit 112b of the currency and/or the amount of money to be charged-to, or debited-from, financial medium 114b. The account manager subsystem 120 may provide the game system 106 with information indicative of a ticket identifier that is associated with the newly created account record 124. Alternatively, in some embodiments, the account manager subsystem 120 may receive information indicative of a ticket identifier that is associated with the newly created account record 124 from the game system 106.

In some embodiments, the account manager subsystem 122 may create an account record 124 after a player has ended a session of game play at the game system 106. For example, the credit amount 128 of the newly created account record 124 associated with ticket 110c may reflect a number of entertainment credits based at least in part on the number of available entertainment credits at the end of the session of game play by the player.

In some embodiments, the account manager subsystem 122 may update an account record 124 after a player has ended a session of game play at the game system 106. For example, the credit amount 128 of the account record 124 associated with ticket 110b may be updated to reflect a change in a monetary value or a change in a number of entertainment credits based at least in part on the number of available entertainment credits at the end of the session of game play.

Figure 2:
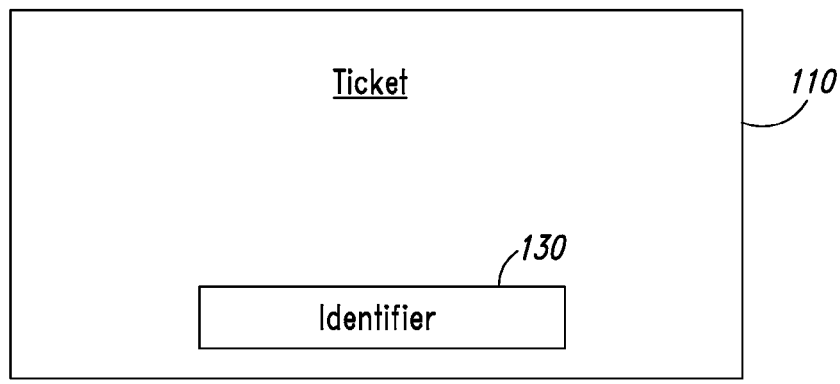
FIG. 2 is a block diagram of a ticket for purchasing an instance of game play at the game-entertainment system according to one non-limiting illustrated embodiment.
Figure 3:
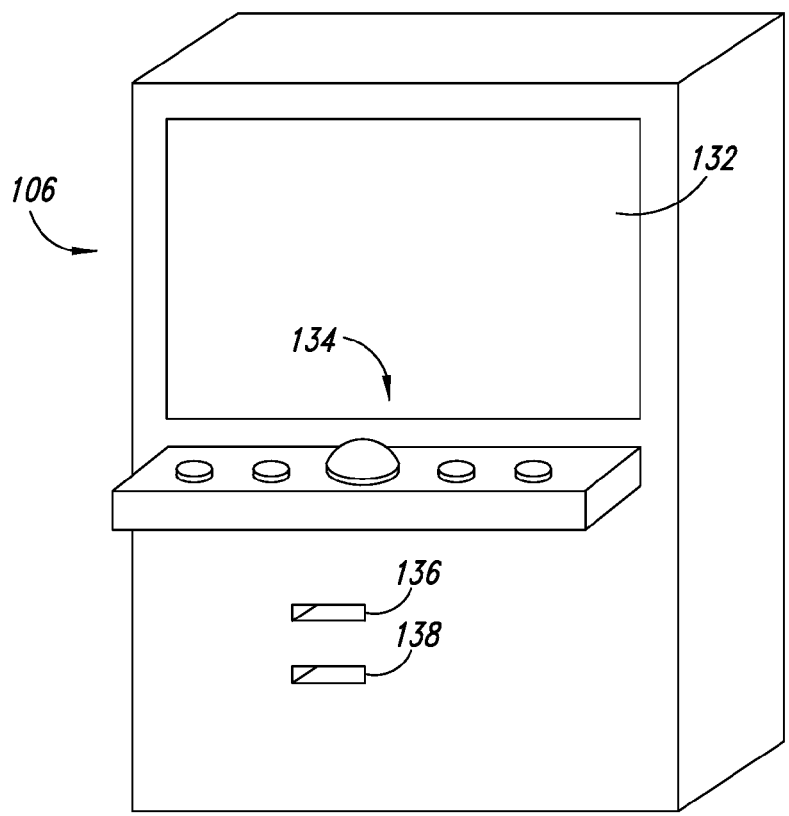
FIG. 3 is an isometric view of a game system of the game-entertainment system according to one non-limiting illustrated embodiment.

FIG. 2 shows a ticket 110 according to one non-limiting illustrated embodiment. The ticket 110 may be made of paper or similar material and/or other pliable material. The ticket 110 includes a ticket identifier 130. In some embodiments, the ticket identifier 130 may be one or more machine-readable symbols (e.g., bar code symbols, stack code symbols, area or matrix code symbols) that encode a ticket code that may be indicative of unique ticket identification information. In such embodiments, the game system 106 and the ticket dispenser/redeemer 108 may include one or more machine-readable symbol readers, such as scanners or imagers that read bar codes, stacked codes, and/or area or matrix codes, and the game system 106 and the ticket dispenser/redeemer 108 may include instructions for decoding such machine-readable symbols. The ticket identifier 130 may be associated with the account identifier 126 of a respective account record 124. The ticket may also include human-readable information, for example, an indication of a current value or worth of the ticket in currency or credits FIG. 3 shows a game system 106 according to one non-limiting embodiment. The game system 106 includes a display device 132 and a user interface 134. The user interface 134 may include various buttons, keys, track wheel, track ball, joy stick, key pad, number pad, touch pad, touch screen, user selectable icons, etc. A player may use the user interface 134 to, among other things, select a game or virtual game, control and play a game or virtual game, and to select an amount to be charged-to, or debited-from, financial medium 114b.

The gaming machine 106 also includes an item of value (IOV) receiver 136 and a financial medium receiver 138. The IOV receiver 136 may receive items that are purportedly of value. The IOV receiver 136 is configured to receive units 112b of a respective currency and tickets 110b. In some embodiments, the IOV receiver 136 may receive units 112b of a currency of various denominations and of various currencies, e.g., a Canadian ten dollar bill and a U.S. ten dollar bill.

The financial medium receiver 138 may receive financial media 114b such as credit cards, debit cards, gift cards, smart cards, etc. A user of the game system 106 may use the IOV receiver 136 and/or the financial medium receiver 138 along with ticket 110b and/or the unit 112a of the currency and/or financial medium 114b to commence a session of game play. In some embodiments, the IOV receiver 136 may be adapted to receive the financial medium 114b, which may negate the need for the financial medium receiver 138.

Figure 4A:
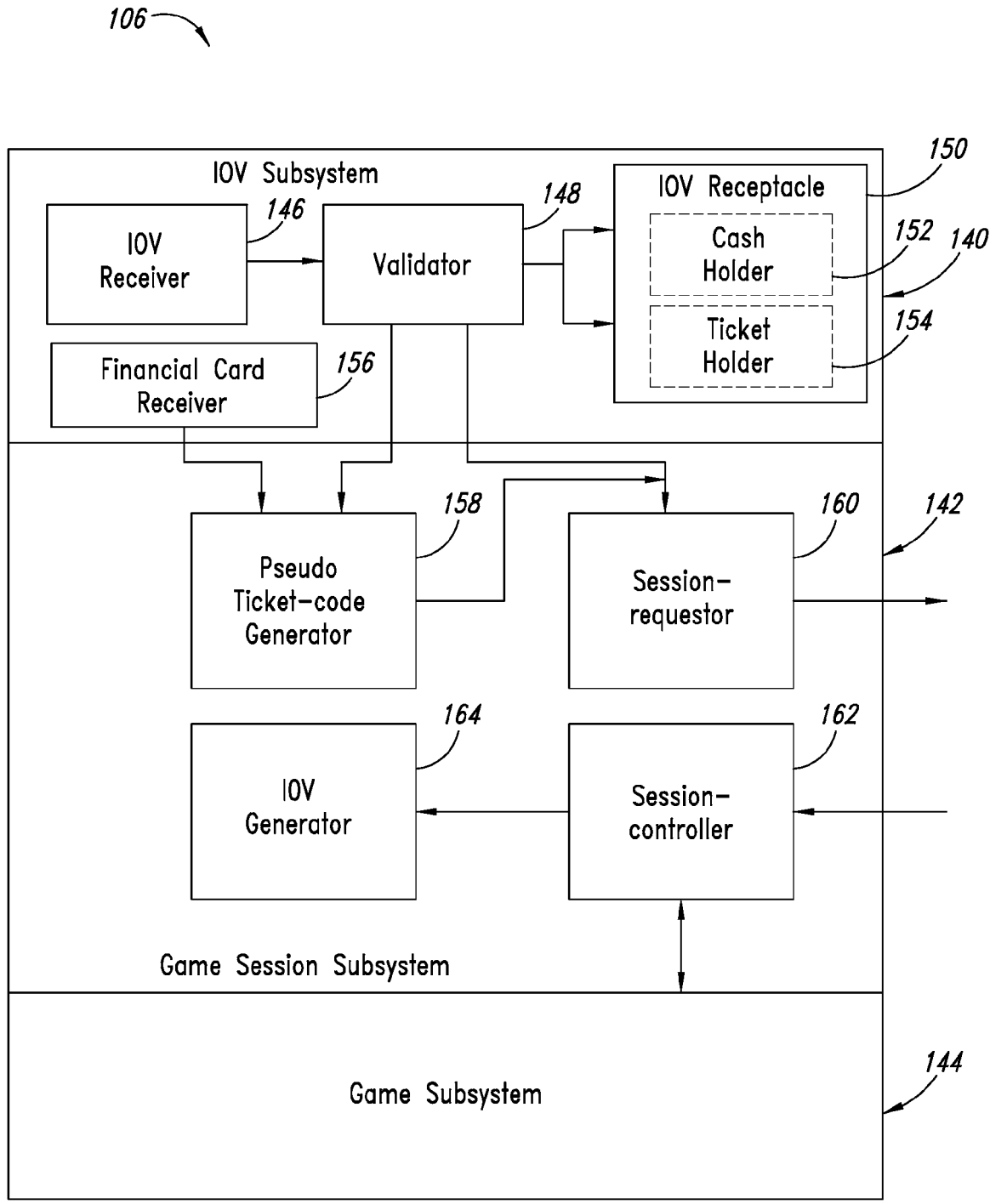
FIG. 4A is a block diagram of a game system of the game-entertainment system according to one non-limiting illustrated embodiment.

FIG. 4A is a block diagram of a game system 106 according to one non-limiting illustrated embodiment. The game system 106 includes an IOV subsystem 140, a game session subsystem 142, and a game subsystem 144. The game subsystem 144 may be configured to provide an instance of a game to the user. In some embodiments, the game system 106 may be configured to provide an instance of game play only if the instance of game play was purchased by a ticket 110.

The IOV subsystem 140 includes an IOV receiver 146, a validator 148, and an IOV receptacle 150. The IOV receiver 146 receives items that are purportedly items of value such as tickets 110 and units 112 of a respective currency. The IOV receiver 146 provides the validator 148 with the received items.

The validator 148 may be configured to validate purported items of value. The validator 148 may determine whether a purported item of value is a valid ticket and/or a valid unit of a currency. For example, the validator 148 may determine whether a purported item of value is a valid unit of a currency, such as, but not limited to, a United States (U.S.) dollar bill, a U.S. five-dollar bill, a U.S. ten-dollar bill, a U.S. twenty-dollar bill, etc. Such may include optically, magnetically, inductively, capacitively, or otherwise sensing various characteristics of the purported item of value and comparing the sensed characteristics to defined values representative of valid characteristics. In some embodiments, the validator 148 may be configured to validate units of currency for multiple currencies. The validator 148 may be also configured to validate received tickets 110. Among other things, the validator 148 may read the ticket identifier 130 on a ticket 110. If the validator 148 determines that a purported item of value is valid, the validator 148 provides the validated item of value to the IOV receptacle 150. In some embodiments, if the validator 148 cannot validate a purported item of value, the purported item of value may be rejected and may be ejected the game system 106 via the IOV receiver 146 or with or without notifying appropriate personnel.

The IOV receptacle 150 may be configured to receive and securely hold validated items of value. In some embodiments, validated items of value may be held in a lock box or the like. In some embodiments, the IOV receptacle 150 may include an optional cash holder 152 and an optional ticket holder 154. The cash holder 152 may be used to hold validated units 112 of a currency separately from validated tickets 110, which may be held in the ticket holder 154.

The validator 148 may be configured to provide item of value information to the game session subsystem 142. For example, if the validated item is a unit of a currency, item of value information may include, among other things, a denomination of the unit of the currency, at least a portion of a serial number of the unit of the currency, and/or a currency indication for the unit of the currency, e.g., United States currency or Canadian currency. As another example, if the validated item is a ticket, item of value information may include a ticket code. Non-limiting examples of information that may be carried by a ticket code include at least a portion of ticket identification information encoded by the ticket identifier 130 of the ticket 110, information indicative of the ticket identifier 130, information indicative of the unique ticket identification information encoded by the ticket identifier 130, among other things.

The financial medium receiver 156 may be configured to receive financial media such as credit cards, debit cards, gift cards, smart cards, etc., and communicate with a financial institution such as a credit card company, a bank, a credit union, etc. The financial medium receiver 156 may provide item of value information to the game session subsystem 142. Item of value information for the case of a financial medium may include an indication of a monetary value, information indicative of the received financial card, etc.

The game session subsystem 142 may include a pseudo ticket code generator 158, a session requester 160, a session controller 162, and an IOV generator 164. The pseudo ticket code generator 158 receives item of value information from either the validator 148 or the financial medium receiver 156, when a validated item of value is not a unit of a currency. The pseudo ticket code generator 158 may generate a pseudo ticket code based at least in part on the received item of value information. The pseudo ticket code generator 158 may include a counter (not shown) that may be incremented whenever the pseudo ticket code generator 158 generates a pseudo ticket code. In some embodiments, the pseudo ticket code generator 158 may include multiple counters, and each one of the counters may be associated with a different type of validated item of value, e.g., a counter for units of a currency and another counter for financial media, etc.

When a validated item of value is a ticket 110, the session requester 160 may receive a ticket code from the validator 148; and when a validated item of value is not a ticket, the session requester 160 may receive a pseudo ticket code from the pseudo ticket code generator 158. The session requester 160 may generate a session request based at least in part on the received ticket code or the received pseudo ticket code. For example, if the validated item of value is a ticket 110, the session request may include information indicative of the unique ticket identification information encoded by the ticket identifier 130 of the ticket 110. As another example, if the validated item of value is a unit of a currency, the session request may include information indicative of a count of a counter associated with the unit of the currency, the denomination of the unit of the currency, the currency, etc. The session requester 160 sends the session request to the system controller 116.

In some embodiments, the ticket code information and the pseudo ticket code information may be formatted essentially identically such that the session requester 160 cannot determine whether the validated item of value is a valid ticket or not. For example, in some embodiments, both ticket code information and pseudo ticket code information may be of equal fixed length.

The session controller 162 may receive session authorization information from the system controller 116. Session authorization information may include, among other things, information indicative of a number of entertainment credits. In addition, session authorization information may include, among other things, information indicative of a grant of permission or a denial of permission to an instance of game play. In some embodiments, a denial of permission to an instance of game play may be inferred from the number of entertainment credits, e.g., if zero entertainment credits, then denial of permission.

Based at least in part on the session authorization information from the system controller 116, the session controller 162 may grant a player an instance of game play and determine a total number of available entertainment credits that may be used to purchase an instance(s) of game play. Each time the player purchases another instance of game play, the session controller 162 may debit a number of entertainment credits from the total number of available entertainment credits. Each time the player is awarded or receives a number of entertainment credits, the session controller 162 may add the number of received entertainment credits to the total number of available entertainment credits. In some embodiments, at the end of the session of game play, the session controller 162 may provide the system controller 116 with session information indicative of the total number of available entertainment credits and provide the player with the ticket 110c, which may now be associated the total number of available entertainment credits. The system controller 116 may provide the game system with information indicative of ticket identification information encoded by the ticket identifier 130 of ticket 110c. In some embodiments, the ticket 110c may be the same ticket 110b that the player used to purchase an instance of game play.

The session controller 162 may be communicatively coupled to the IOV generator 164 and may provide the IOV generator 164 with information indicative of identification information. When a player ends a session of game play, the IOV generator 164 may generate a new ticket 110c based at least in part on the information indicative of ticket identification information encoded by the ticket identifier 130. The IOV generator 164 may provide the ticket 110c to the player.

In some embodiments, the IOV generator 164 may print the ticket identifier 130 on a surface of the ticket 110. In other embodiments, the ticket identifier 130 may be pre-printed on a surface of the ticket 110. In that case, the IOV generator 164 may read the ticket identifier 130 on the ticket 110 may provide the session controller 162 with information indicative of the ticket identification information encoded by the ticket identifier 130. The session controller 162 may provide the system controller 116 with information indicative of the ticket identification information encoded by the ticket identifier 130.

Various ones of the modules and/or subsystems described above such as the validator 148, financial medium receiver 156, pseudo ticket code generator 158, session requestor 160, session controller 162, IOV generator 164, and game subsystem may be individually or collectively embodied in one or more logical devices such as a custom made or commercially available processor, a central processing unit (CPU), a semiconductor based microprocessor (in the form of a microchip or chip set), or generally any device for executing software instructions and/or may be individually or collectively embodied in firmware that is stored in a memory and that is executed by a suitable instruction execution system. If implemented in hardware, as in an alternative embodiment, the any one or all of the aforementioned modules and subsystem may be individually or collectively implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4B:
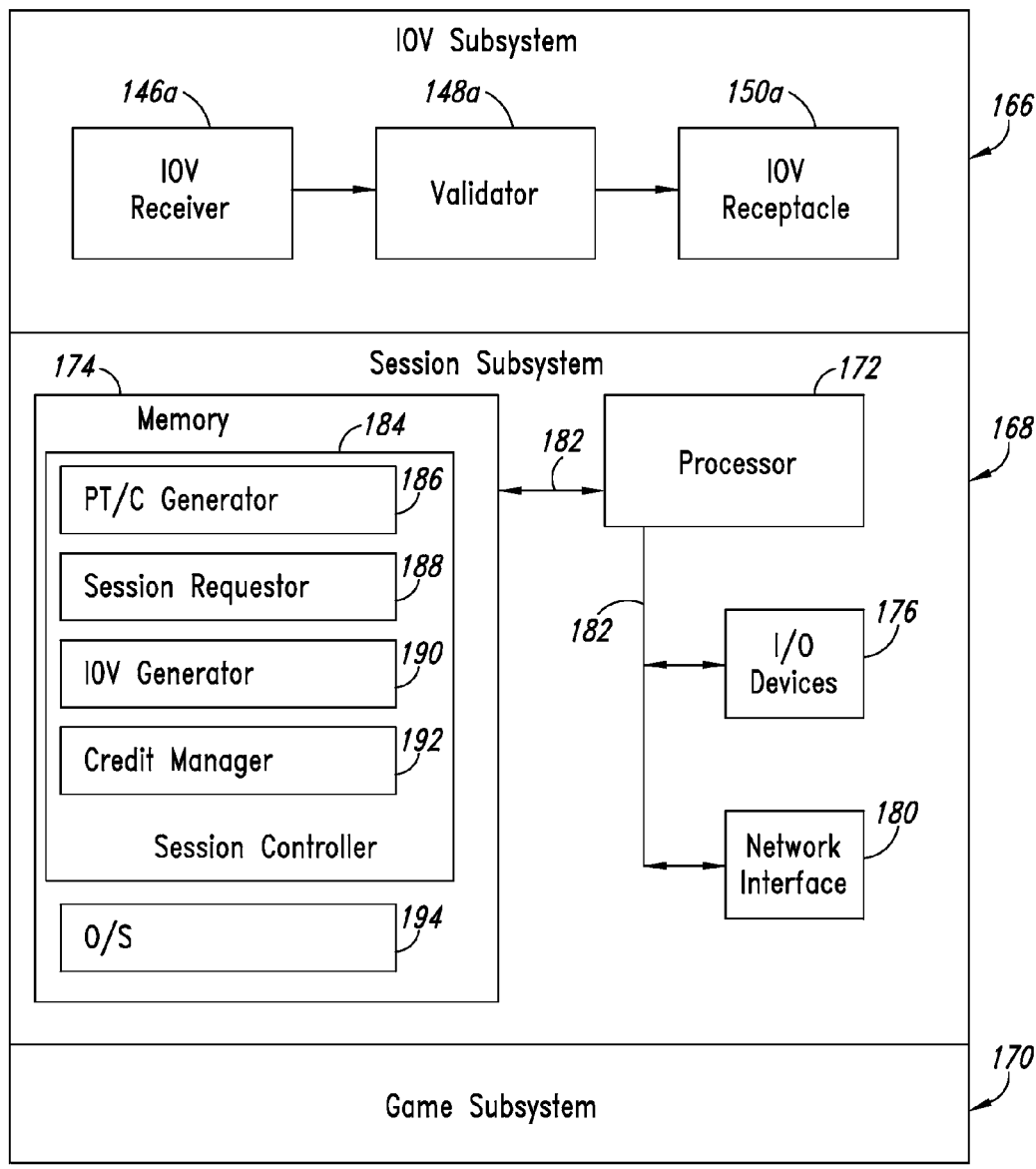
FIG. 4B is a block diagram of another game system of the game-entertainment system according to one non-limiting illustrated embodiment.

FIG. 4B shows a game system 106 according to another non-limiting illustrated embodiment. The game system 106 includes an IOV subsystem 166, a session subsystem 168, and a game subsystem 170. The game subsystem 170 is similar in at least some respects to the game subsystem 144 and will not be discussed in detail for the sake of brevity. In FIG. 4B, the various labels having both a reference numeral and a letter "a" identify components and/or features that are similar in at least some respects as those shown in FIG. 4A that are labeled with the same reference numeral. The detailed description of such components are initially provided with respect to the embodiment of FIG. 4A and, for the sake of brevity, the description of such components in the context of their subsequent "a" labeled counterparts in FIG. 4B are abbreviated or omitted.

The session subsystem 168 includes a processor 172, a memory 174, input/output devices 176, and network interface 180, which are communicatively coupled by one or more buses 182.

The processor 172 may be a device for executing software, particularly that stored in a memory 174. The processor 172 may be a custom made or commercially available processor, a central processing unit (CPU), a semiconductor based microprocessor (in the form of a microchip or chip set), or generally any device for executing software instructions.

The memory 174 is communicatively coupled to the processor 172. The memory 174 may include any one or combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

The memory 174 may store one or more logic modules or logic routines, each of which may comprise an ordered listing of executable instructions for implementing logical functions. In particular, the memory 174 includes an operating system 194 and session controller logic 184. The execution of the operating system 194 by the processor 172 essentially controls the execution of other logic, such as session controller 184 and provides scheduling, input-output control, file and data management, memory management, and communication control and related services.

The session controller logic 194 may include various logic modules or logic routines, each of which may comprise an ordered listing of executable instructions for implementing logical functions. In particular, the session controller logic 194 may include pseudo ticket code generator logic 186, session requester logic 188, IOV generator logic 190, and credit manager logic 192. The pseudo ticket code generator logic 186 includes logic for generating a pseudo ticket code based at least in part on information from the validator 166. The session requester logic 188 includes logic for sending a session request to the control system 116 based at least in part on a ticket code from the validator 148a or a pseudo ticket code from the pseudo ticket code generator logic 186. The IOV generator logic 190 includes logic for generating a ticket. The credit manager logic 192 includes logic for monitoring and accounting of a number of available entertainment credits during a session of game play.

The I/O devices 176 may include user interface devices such as a display and various user selections devices such as buttons, keys, track wheel, track ball, joy stick, key pad, number pad, touch pad, touch screen, user selectable icons, etc.

The network interface 180 may include network cards and/or wireless communication devices that provide a communication link with the system controller 116.

In some embodiments, the session controller logic 184 or a portion of the session controller logic 184 may be implemented in firmware that is stored in a memory and that is executed by a suitable instruction execution system. If implemented in hardware, as in an alternative embodiment, the session controller logic 184 and/or various logic modules or logic routines of the session controller logic 184 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4C:
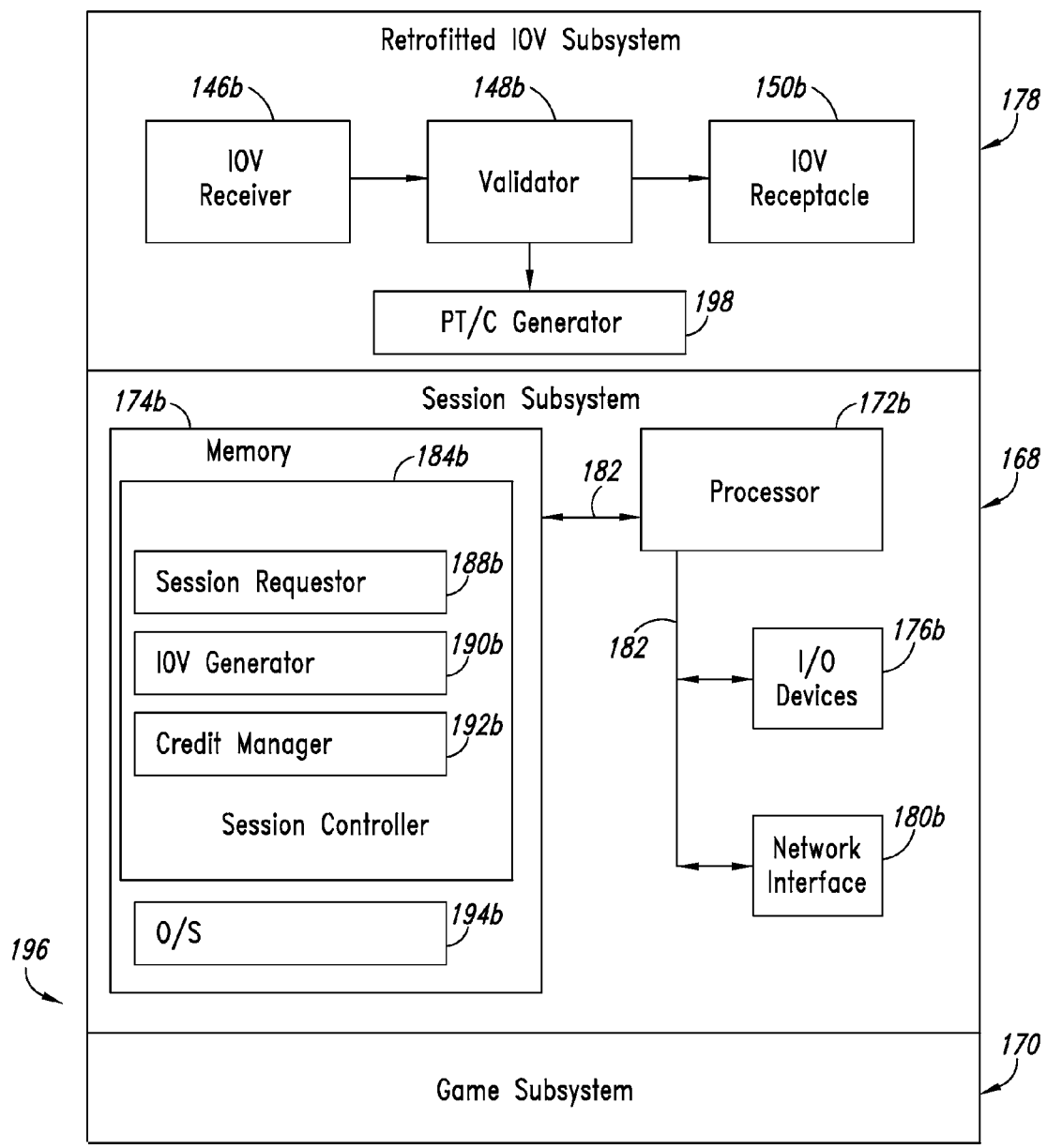
FIG. 4C is a block diagram of retrofitted game system of the game-entertainment system according to one non-limiting illustrated embodiment.

Referring to FIG. 4C, in some embodiments, the game system 106 may include a retrofitted item of value subsystem 178, and a ticket-only game system 196. In FIG. 4C, the various labels having both a reference numeral and a letter "b" identify components and/or features that are similar in at least some respects as those shown in FIG. 4B that are labeled with the same reference numeral and/or with the same reference numeral with a letter "a" concatenated thereto. The detailed description of such components are initially provided with respect to the embodiment of FIG. 4B and, for the sake of brevity, the description of such components in the context of their subsequent "b" labeled counterparts in FIG. 4C are abbreviated or omitted.

The ticket-only game system 196 may include the session subsystem 168b and the game subsystem 170 and may be configured to commence a session of game play only if a valid ticket is used to purchase the initial instance of game play. Prior to being retrofitted, if a player attempted to purchase an instance of game play with a unit of a currency, the ticket-only game system 196 would reject the unit of the currency or such would not even be insertable into the ticket-only game system 196. When a pre-retrofitted validator (not shown) received a unit of a currency, the pre-retrofitted validator (not shown) would provide the session controller 162 with game purchase information such as a denomination of the unit of the currency. In a ticket-only game system, the session controller logic 174 may be configured to reject all purchases of an instance of game play for currency based purchases. In that case, the processor 172 may prompt the pre-retrofitted validator (not shown) to reject the unit of the currency, which may be ejected via the IOV receiver 146a.

The retrofitted IOV subsystem 178 may include the validator 148b and a pseudo ticket code generator 198. In some embodiments, the pseudo ticket code generator 198 may receive a ticket code from the validator 148b when the purported item of value received by the validator 148b is a valid ticket 110. The pseudo ticket code generator 198 may provide the ticket code to the ticket-only game system 196. In other embodiments, the validator 148b may provide the ticket code to the ticket-only game system 196 when the purported item of value received by the validator 148b is a valid ticket 110.

When the purported item of value received by the validator 148b is not a ticket 110, the pseudo ticket code generator 198 may receive, among other things, an indication of a denomination of a unit of a currency. Based at least in part on the indication of a denomination of a unit of currency, the pseudo ticket code generator 198 may generate a pseudo ticket code and provide the pseudo ticket code to the ticket-only game system 196. The ticket-only game system 196 will use the pseudo ticket code to request a session of game play which may be carried on or by a computer-readable medium.

Figure 5A:
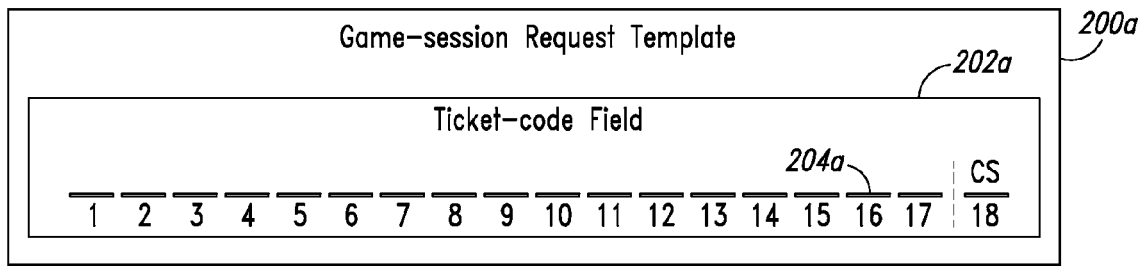
FIG. 5A is a block diagram of a game session request template according to one non-limiting illustrated embodiment.

FIG. 5A shows a game session request template 200a according to one illustrated embodiment. The game session request template 200a includes a ticket code field 202a, which may be of fixed or variable length. The ticket code field 202a includes a number of data carrier elements 204a. A respective one of the data carrier elements 204a may be sized to carry a bit, a byte, a word, etc., of information. In the embodiment illustrated in FIG. 5A, there are eighteen (18) data carrier elements 204a shown. In other embodiments, the number of data carrier elements 204a may be fewer or more. In the illustrated embodiment, the first seventeen data carrier elements may carry information indicative of a ticket code and/or information indicative of a pseudo ticket code, and in the illustrated embodiment, the eighteenth data carrier element may carry error detection information such as a checksum of the first seventeen data carrier elements.

Figure 5B:
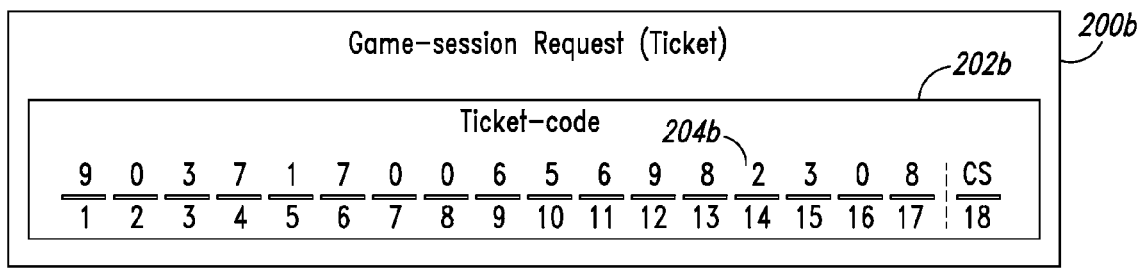
FIG. 5B is a block diagram of a game session request data structure for a ticket based purchase according to one non-limiting illustrated embodiment.

The session requester 158 may populate the ticket code field 202a based at least in a ticket code provided by the item of value subsystem 140. FIG. 5B shows an exemplary game session request 200b data structure for the case where a player purchases an instance of game play with a valid ticket 110.

The validator 148 reads the ticket identifier 130 of the ticket 110. The ticket identifier 130 may be a machine-readable symbol encoding unique ticket identification information. The validator 148 may provide a ticket code, which may be indicative of the unique ticket identification information and/or indicative of the ticket identifier 130, to the session requestor 160. Based at least in part on the ticket code, the session requester 160 populates the ticket code field 202b. The information carried by the ticket code field 202b may be indicative of the ticket identifier 130 and/or indicative of the unique ticket identification information. For example, the ticket identifier 130 may be a machine-readable symbol encoding a sequence of seventeen numbers. Each one of the first seventeen data carrier elements 204b may be a respective one of the seventeen numbers encoded by the ticket identifier 130. The eighteenth data carrier element 204b may carry error detection information such as a checksum and/or error correction.

Figure 5C:
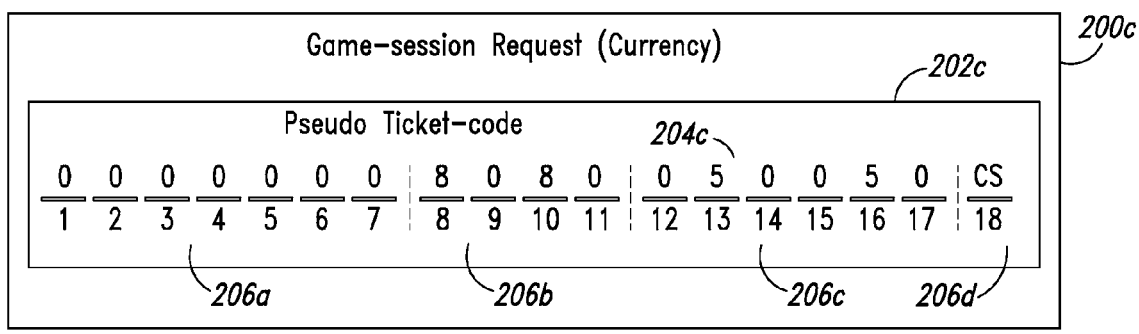
FIG. 5C is a block diagram of a game session request data structure for a unit of a currency based purchase according to one non-limiting illustrated embodiment.

FIG. 5C shows an exemplary session request 200c data structure for the case where the player purchases an instance of game play with a validated unit of a currency. In this case, the pseudo ticket code generator 158 generates a pseudo ticket code based at least in part on item of value information from the validator 148. Based at least in part on the pseudo ticket code, the session requester 160 populates the ticket code field 202b. The information carried by the ticket code field 202c may be indicative of a denomination for the validated unit of currency and/or indicative of a count of a counter associated with the validated unit of currency. As one non-limiting example, the ticket code field 204c may be conceptualized as having four segments 206a-206d having seven, four, six, and 1 data carrier elements, respectively. The seven data carrier elements 204 in segment 206a may be set to identify the game session request 200c as being a currency based request and may also be indicative of the respective currency, e.g., U.S. currency, Canadian currency, etc. The four data carrier elements 204 in the second segment 206b may carry information indicative of a count of a number of validated units of currency. The six data carrier elements 204 in the third segment 206c may carry information indicative of a denomination of the validated unit of currency. The data carrier element 204 in the fourth segment 206d may carry error detection and/or error correction information. As a non-limiting example, if the purported item of value received by the validator 148 is a valid U.S. fifty-dollar bill, the first seven data carrier elements 204 may be set to all zeros to signify that the validated item of value is U.S. currency. The eighth and ninth data carrier elements 204 may be set to a count of a currency counter, and for redundancy, the tenth and eleventh data carrier elements 204 may be set to the count of a currency counter. The $12^{th}$-$14^{th}$ the data carrier elements 204 may be set to carry information that indicates the denomination (fifty dollars) of the validated unit of currency, and for redundancy, the $15^{th}$-$17^{th}$ data carrier elements 204 may be set to carry information that indicates the denomination (fifty dollars) of the validated unit of currency. The eighteenth data carrier elements 204 may carry error detection information.

Figure 6A:
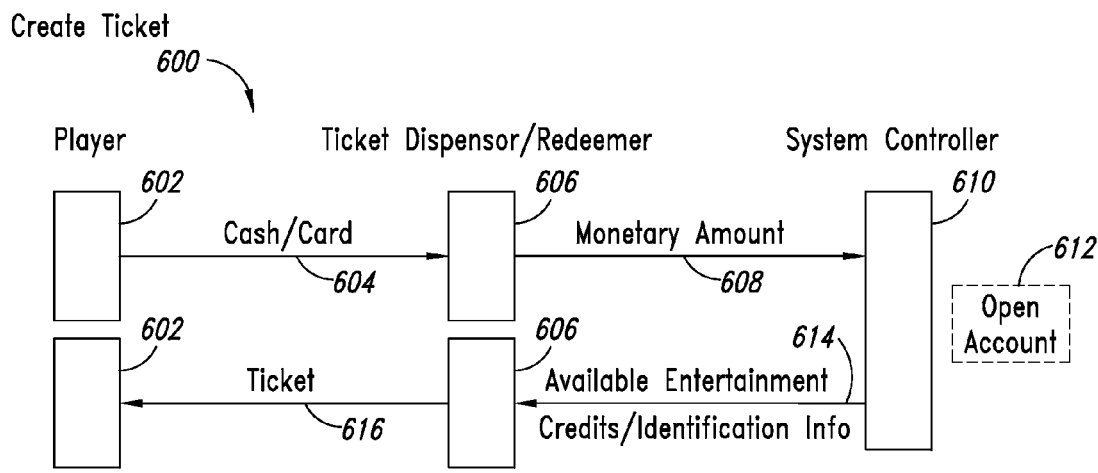
FIGS. 6A-6B are flow diagrams of processes to open an account according to one respective non-limiting illustrated embodiment.

FIG. 6A shows a flow diagram 600 of an account being created according to one illustrated embodiment.

A player 602 may use cash, i.e., a unit of a currency, or a financial medium or other financial instrument 604 to purchase a ticket at a ticket dispenser/redeemer 606. The ticket dispenser/redeemer may provide purchase information 608 that may be indicative of a monetary amount to a system controller 610. The system controller 610 may open an account 612 based at least in part on the purchase information 608 provided by the ticket dispenser/redeemer 606.

The system controller 610 may provide the ticket dispenser/redeemer 604 with account information 614 that may be indicative of an available number of entertainment credits and/or identification information. The identification information may be related to the account 612 and/or may be related to a ticket identifier.

The ticket dispenser/redeemer 606 may provide a ticket 616 to the player 602. The ticket 616 may include a ticket identifier that may encode the identification information related to the account 612 or may encode information indicative of unique ticket identification information.

Figure 6B:
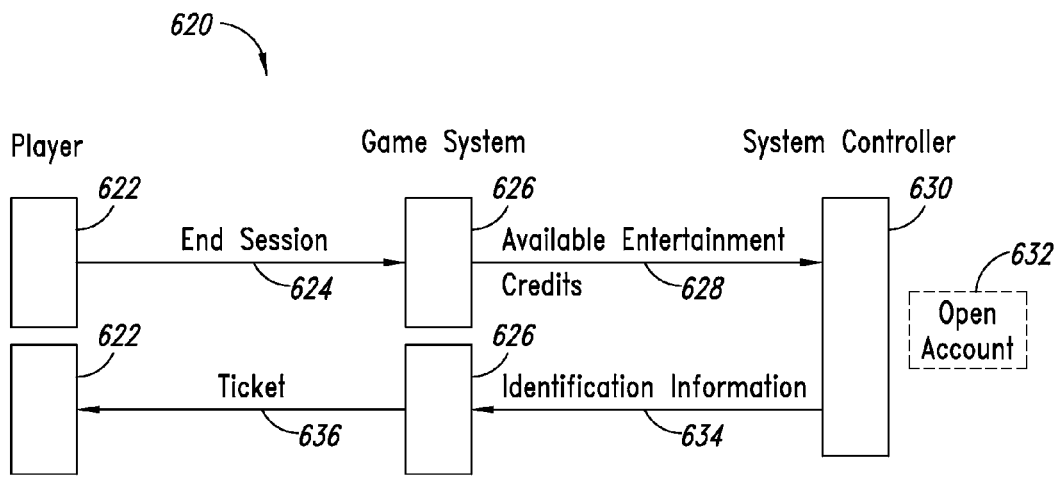

FIG. 6B shows a flow diagram 620 of an account being created according to another illustrated embodiment.

A player 622 may provide input 624 for ending a session of game play at a game system 626. The game system 626 may determine a number of available entertainment credits at the end of the session of game play. Entertainment credits may be purchased or awarded or otherwise received, e.g., compliments of the game-entertainment system 100, during game play. The game system 626 may provide session information 628 which may be indicative of the number of available entertainment credits to a system controller 630.

The system controller 630 may open an account 632 based at least in part on the session information 628. The system controller 630 may provide the game system 626 with account information 634 which may be indicative of an available number of entertainment credits and/or identification information. The identification information may be related to the account 632 and/or may be related to a ticket identifier.

The game system 626 may provide the player 622 with a ticket 636. The ticket 636 may include a ticket identifier that may encode the identification information related to the account 632 or may encode information indicative of unique ticket identification information.

The player 622 may redeem the ticket 636 at another game system or at the ticket dispenser/redeemer.

Figure 7A:
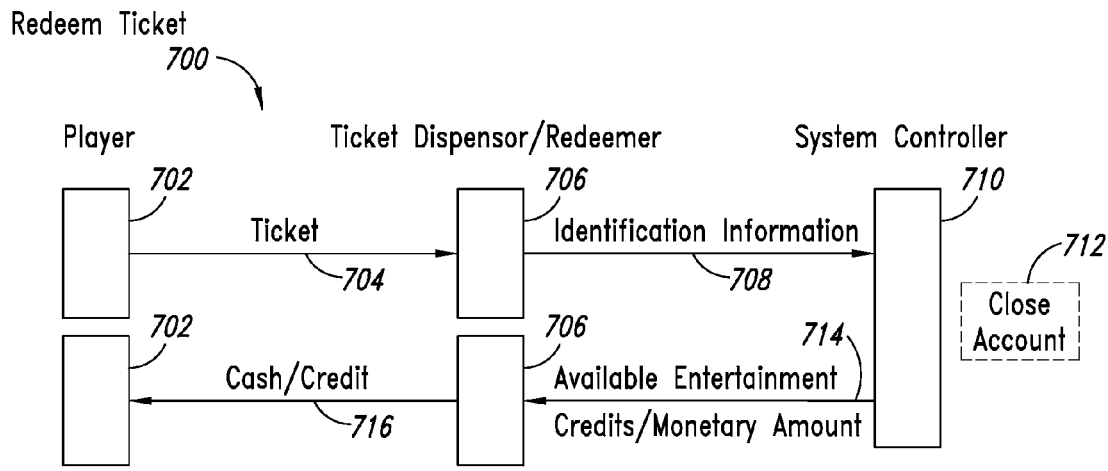
FIGS. 7A-7B are flow diagrams of processes to close an account according to one respective non-limiting illustrated embodiment.

FIG. 7A shows a flow diagram 700 of an account being closed according to one illustrated embodiment.

A player 702 may provide a ticket dispenser/redeemer 706 with a ticket 704 having a ticket identifier. The ticket identifier may encode ticket identification information or a ticket code.

The ticket dispenser/redeemer 706 may provide the ticket code 708 and/or an indication of the ticket code to a system controller 710. The ticket code 708 may be indicative of unique ticket identification information.

The system controller 710 may close an account 712 based at least in part on the ticket code 708. The system controller 710 may determine a number of available entertainment credits associated with the account 712. The system controller may provide the ticket dispenser/redeemer 706 an account indicator 714 indicative of a number of available entertainment credits.

The ticket dispenser/redeemer 706 may provide the player 702 with units of currency or credits 716 based at least in part on the account indicator 714. If the player does not receive units of currency, credits 716 may be applied to a financial card, or funds may be deposited into a financial account specified by the player. In some embodiments, credits may not be redeemed for cash or a monetary value, but rather are only redeemable for game play. Such credits may also have an associated time limit, that limits a period during which such credits must be used or are otherwise lost or forfeited.

Figure 7B:
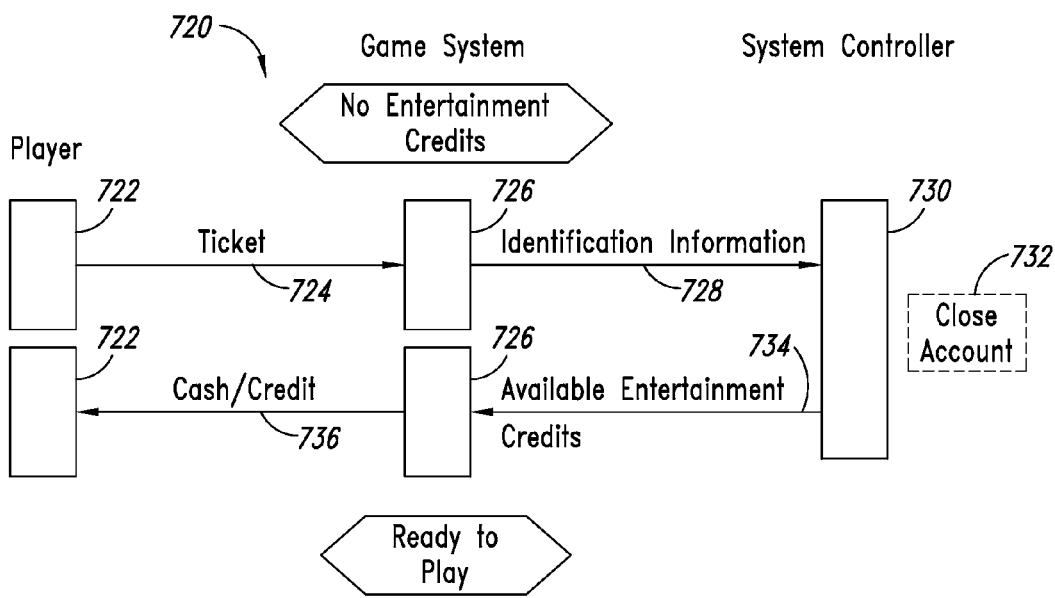

FIG. 7B shows a flow diagram 720 of an account being closed according to another illustrated embodiment.

A player 722 may provide a ticket 724 having a ticket identifier to a game system 726. Prior to the game system 726 receiving the ticket 724, there are no entertainment credits available for a session of game play at the game system 726.

The game system 726 may read the ticket identifier from the ticket 724. The ticket identifier may encode ticket identification information or a ticket code.

The game system 726 may provide the ticket code 728 and/or an indication of the ticket code to a system controller 730. The ticket code 728 may be indicative of unique ticket identification information.

The system controller 730 may close an account 732 based at least in part on the ticket code 728. The system controller 730 may determine a number of available entertainment credits associated with the account 732. The system controller 730 may provide the game system 726 an account indicator 734 indicative of the number of available entertainment credits.

The game system 726 may include a credit manager. The credit manager may indicate that the game system 726 is ready to play if the number of available entertainment credits is above a threshold amount.

Figure 8:
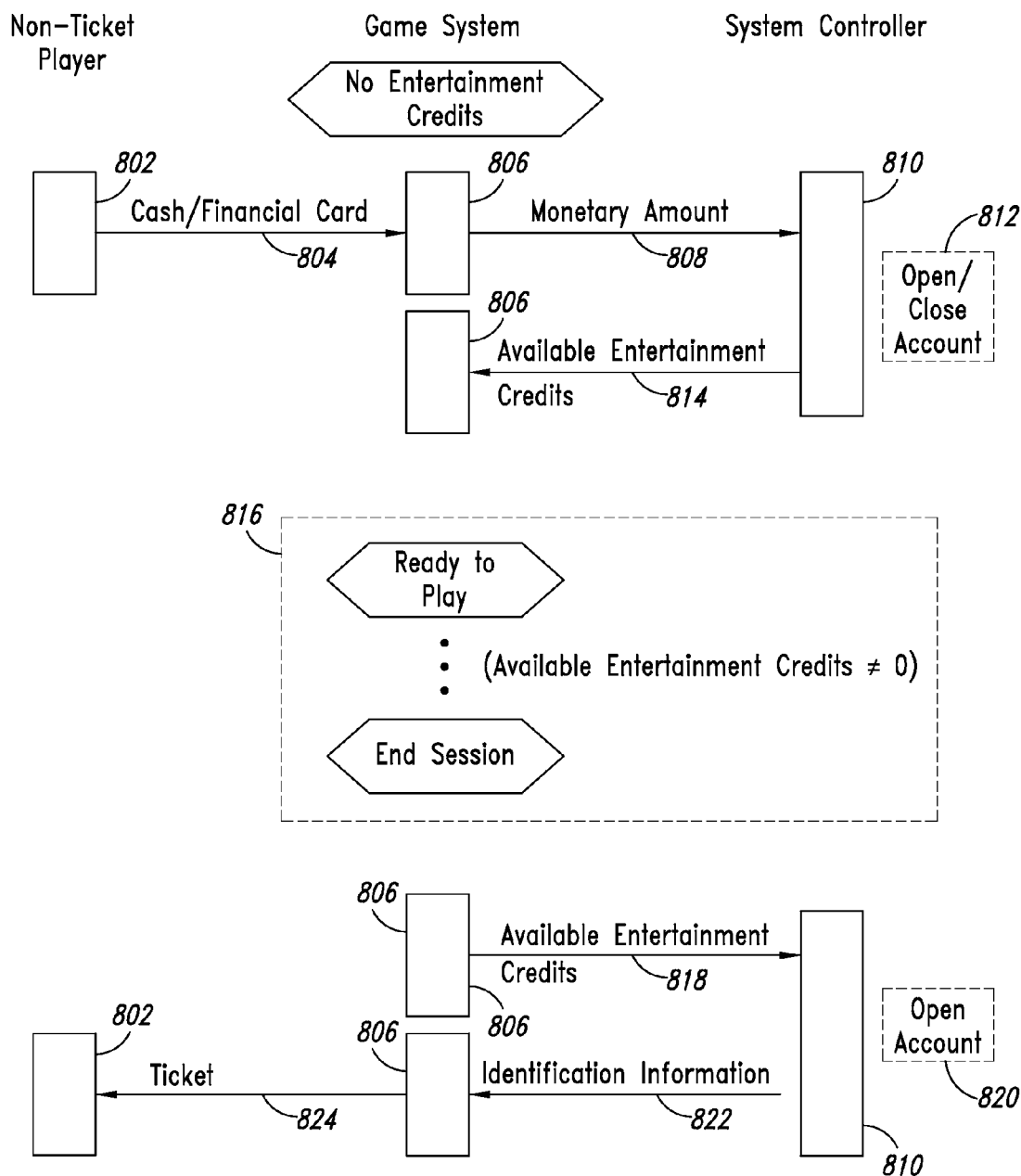
FIG. 8 is a flow diagram of a session of game play purchased with an item of value that is not a ticket according to one non-limiting illustrated embodiment.

FIG. 8 shows a flow diagram 800 of a session of game play purchased with an item of value that is not a ticket according to one illustrated embodiment.

A player 802 may provide a game system 806 with cash, i.e., a unit of a currency, a financial card, or other financial instrument 804 to purchase an instance of game play at the game system 806. Prior to the player 802 providing the unit of a currency, financial card, or other financial instrument 804 to the game system 806, there are no entertainment credits available for the player at the game system 806. The game system 806 may provide purchase information 808 which may, for example, be indicative of a monetary amount, e.g., a purchase amount, to a system controller 810.

The system controller 810 may open an account 812 based at least in part on the purchase information 808. The system controller 810 may close the account 812 and provide the game system 806 with an account indicator 814 which may indicative of a number of available entertainment credits. The opening and closing of account 812 may be done for accounting purposes, and/or so that non-ticket transactions may be processed in a manner consistent with ticket transactions.

If the account indicator 814, which may be indicative of the number of available entertainment credits, is sufficient for a purchase of an instance of game play at the game system 806, then a session of game play 816 may be commenced at the game system 806. It should be understood that the player 802 may continue to provide the game system 806 with further cash, i.e., another unit of a currency, and/or financial card(s), and/or other financial instrument(s) to increase the player's total number of available entertainment credits. Each time the player provides a valid item of value, the game system 806 will receive another account indicator, and the game system will determine a total number of available entertainment credits based at least in part on the received account indicators.

During the session of game play 816, the player 802 may be awarded or receive entertainment credits and may also spend entertainment credits to purchase further instances of game play. Assuming that at the end of the session of game play that the player has some available entertainment credits, i.e., the player did not spend every entertainment credit, the game system 806 may provide the system controller 810 with session information 818 which may be indicative of a number of available entertainment credits at the end of the session of game play.

The system controller 810 may open an account 820. The system controller 810 may provide the game system 806 with account information 822 that may be indicative of identification information related to the account 820. The identification information may be indicative of an identifier for the account 820.

The game system 806 may generate a ticket 824 based at least in part on the account information 822. The ticket 824 may carry a ticket identifier that is indicative of the identification information related to the account 820. The game system 806 may provide the ticket 824 to the player 802.

Figure 9:
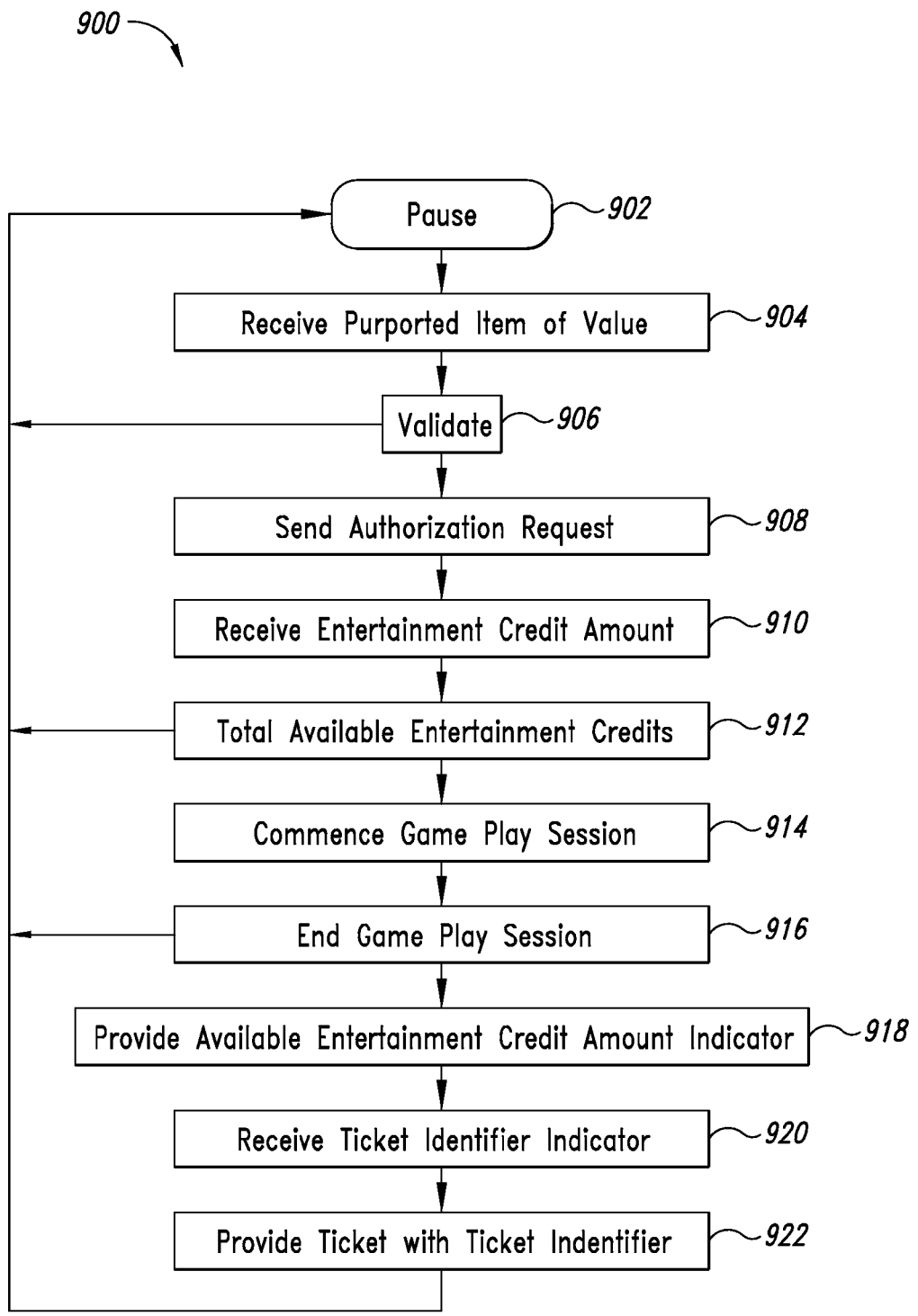
FIG. 9 is a flow diagram of a process for providing a session of game play to a user at a game system according to one non-limiting illustrated embodiment.

FIG. 9 shows a flow diagram 900 of a process for providing a session of game play to a user at a game system.

At 902, the game system is idle or paused waiting on a player to provide the game system with a purported item of value.

At 904, the game system receives a purported item of value.

At 906, the game system validates the purported item of value. If the purported item of value is not successfully validated, the purported item of value may be ejected from the game system, and the process returns to 902. If the purported item of value is a valid item, the process continues to 908.

At 908, the game system provides or sends an authorization request to the system controller.

At 910, the game system receives account information indicative of an entertainment credit amount.

At 912, the game system totals a number of available entertainment credits. The game system determines whether the total number of available entertainment credits is above a threshold, and if so, enables the player to commence a session of game play. Otherwise, the game system may provide the player with an indication of the current total number of available entertainment credits and return to 902.

At 914, a session of game play is commenced. The player purchases a first instance of game play from the total number of entertainment credits purchased by the player. The game system debits the player's total number of available entertainment credits for the purchase of the first instance of game play and for each instance of game play purchased thereafter. The game system adds entertainment credits received by the player during the session of game play to the player's total number of available entertainment credits.

At 916, responsive to user input, the game system ends the session of game play. In some situations, the session of game play ends when the player no longer has a sufficient number of entertainment credits to purchase another instance of game play. If the player has zero entertainment credits, the process continues at 902.

At 918, the game system provides the system controller with an available entertainment credit amount indicator.

At 920, the game system receives from the system controller a ticket identifier indication. The ticket identifier indication may be indicative of unique ticket identification information and/or related to an account.

At 922, the game system provides a ticket with a ticket identifier to the player.

Figure 10:
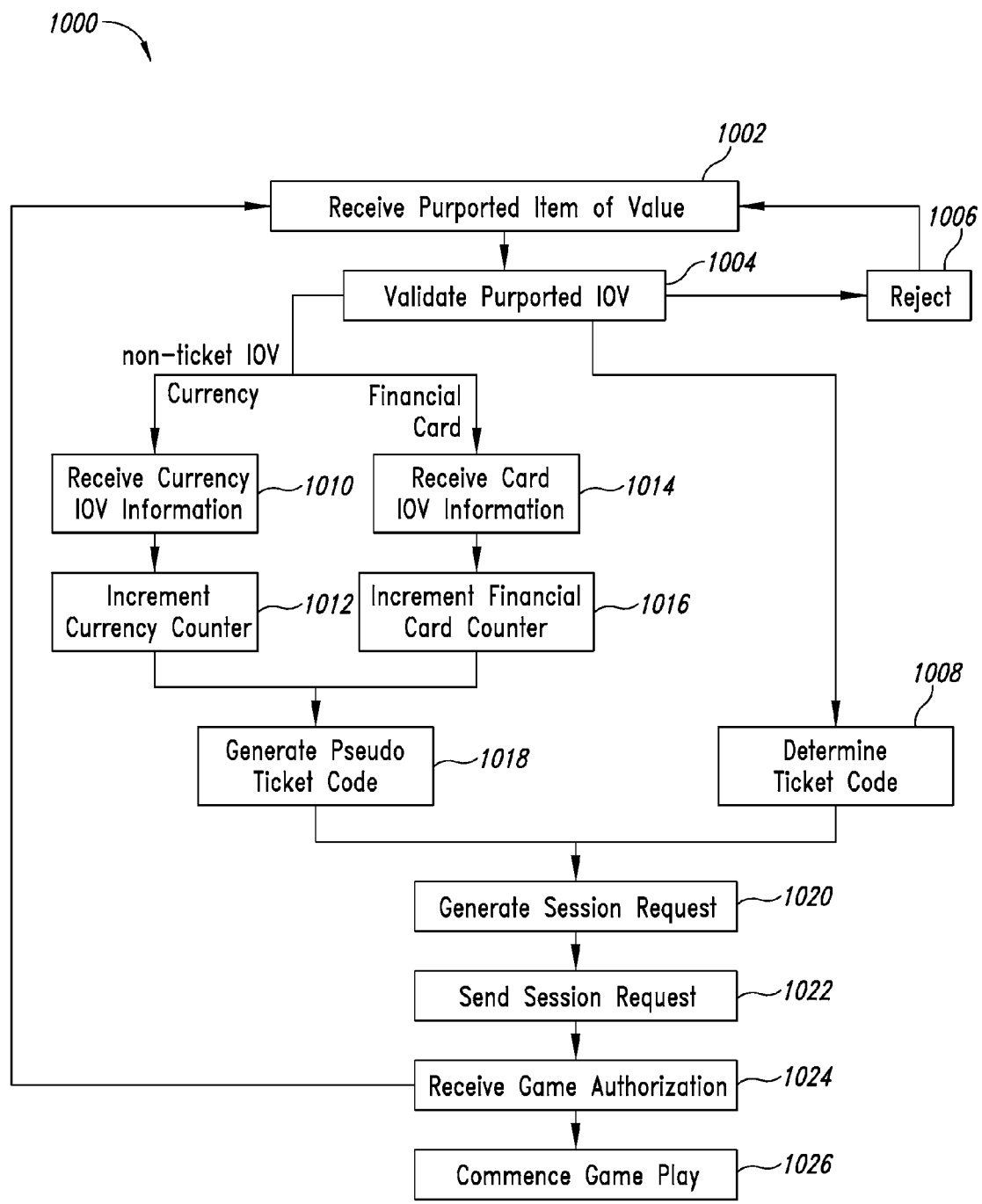
FIG. 10 is a flow diagram of a process for initiating a session of game play at the game system according to one non-limiting illustrated embodiment.

FIG. 10 shows a process 1000 for initiating a session of game play at the game system.

At 1002, the game system 106 receives a purported item of value from a player.

At 1004, the validator 148 validates the purported item of value. If the purported item of value is not valid, then at 1006 the purported item of value is rejected. The process then continues at 1002.

However, if the purported item of value is valid, the validator 148 determines whether the item of value is a unit of a currency, a financial card, or a ticket. If the validated item of value is a ticket, the process continues at 1008 where the validator 148 determines a ticket code from the validated ticket. The ticket code may be a portion of the ticket identifier which is read by the validator 148 or may be indicative of the ticket identifier.

Referring back to 1004, if the validated item of value is a unit of currency, the process continues 1010. At 1010, the pseudo ticket code generator 158 receives currency IOV information. Currency IOV information may be indicative of, among other things, a denomination for the validated unit of a currency, the respective currency of the unit of a currency, and other information such as a serial number or a portion of a serial number for the unit of a currency.

At 1012, the pseudo ticket code generator increments/rolls a currency counter. The currency counter may be incremented from zero to ninety-nine, and then roll to zero.

Referring back to 1004, if the validated item of value is a financial card, the process continues 1014. At 1014, the pseudo ticket code generator 158 receives financial medium IOV information. Financial medium IOV information may be indicative of, among other things, a monetary amount, a financial account, and other information such as a transaction confirmation from a financial institution associated with the financial card.

At 1016, the pseudo ticket code generator increments/rolls a financial medium counter. The financial medium counter may be incremented from zero to ninety-nine, and then roll to zero. In some embodiments, block 1016 may be optional.

At 1018, the pseudo ticket code generator 158 generates a pseudo ticket code. The generated pseudo ticket code may be based at least in part on the currency IOV information and/or the count of the currency counter if the validated item of value is a unit of a currency. However, if the validated item of value is a financial card, the pseudo ticket code generator 158 generates a pseudo ticket code that may be based at least in part on the financial medium IOV information and/or the count of the financial medium counter. In some embodiments, one counter may be used to count the number of selected types of non-ticket based purchases, and an indication of the count of that counter may be included in a pseudo ticket code.

At 1020, the session requester 160 generates a session request. If the validated item of value is a ticket, the session request may be based at least in part on the ticket code from the validator 148. However, if the validated item of value is not a ticket, the session request may be based at least in part on the pseudo ticket code from the pseudo ticket code 158.

At 1022, the session requester 160 sends the session request to the system controller 116.

At 1024, the session controller 162 receives game authorization from the system controller 116. The game authorization may indicate whether the game system 106 should or should not provide an instance of game play to the player. If the game authorization indicates the game system 106 should not provide an instance of game play to the player, the process continues at 1002. A denial of an instant of game play may be based at least on an account associated with the validated ticket having insufficient credits for an instance of game play, e.g., the ticket may have already been redeemed. However, if the game authorization indicated that an instance of game play was authorized, the process continues at 1026 where a session of game play is started.

Figure 11:
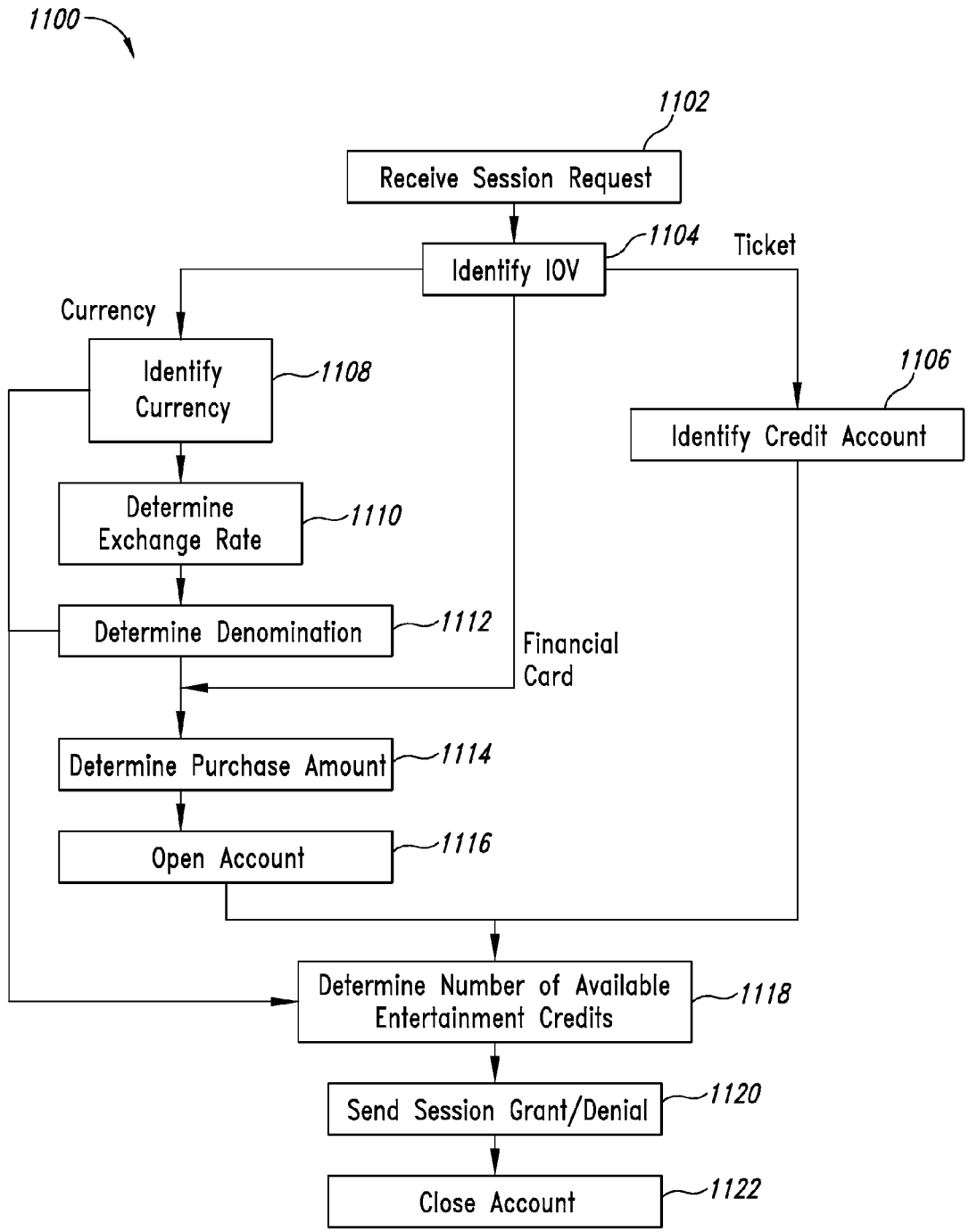
FIG. 11 is a flow diagram of a process for granting/denying session authorization at a game system according to one non-limiting illustrated embodiment.

FIG. 11 shows a process 1100 for granting/denying session authorization at a game system.

At 1102, the system controller 116 receives a session request from a game system 106.

At 1104, the system controller 116 determines the identity of the item of value provided to the game system 106. In some embodiments, the session request may include a ticket code field having a number of data carrier elements. Certain ones of the data carrier elements may be set to indicate that the item of value provided to the game system 106 is a unit of a currency, and, in some embodiments, the currency of the unit of a currency, or a financial card. Similarly, certain ones of the data carrier elements may be set to indicate a financial amount or a denomination, and may also indicate a count. In addition, the ticket code field may be indicative of a ticket code such as unique ticket identification information encoded by a ticket identifier. If the system controller 116 determines the identity of the item of value provided to the game system 106 was a ticket, the process continues at 1106.

At 1106, the system controller 116 identifies a credit account associated with the ticket provided to the game system 106. The identification of the credit account may be based at least in part on information carried by the ticket code field. The carried information may be indicative of a ticket code and/or indicative of unique ticket identification information.

Referring back to 1104, if the system controller 116 determines the identity of the item of value provided to the game system 106 was a unit of a currency based at least in part on the received session request, the process continues at 1108. At 1108, the system controller 116 identifies a currency for the received unit of a currency based at least in part on the received session request. In some embodiments, the system controller 116 can selectively determine that some currencies may be used to purchase an instance of game play and that other currencies may not be used to purchase an instance of game play. For example, the currency of the United States of America may be permitted, but the currency of Cuba may not be permitted. If the system controller 116 determines that the currency of the unit of a currency is not permitted, the process continues at 1118, where the control system 116 may determine that there are zero available entertainment credits. Otherwise, the process continues at 1110.

At 1110, the system controller 116 determines an exchange rate between the currency of the unit of a currency and another currency, which may be the local currency. It should be noted that in some embodiments, the game-entertainment system 100 may accept only one type of currency, and consequently block 1110 may be optional in those embodiments.

At 1112, the system controller 116 determines a denomination of the unit of a currency based at least in part on the received session request. In some embodiments, the system controller 116 can selectively determine that some denominations may be used to purchase an instance of game play and that other denominations may not be used to purchase an instance of game play. For example, a denomination of 50 for a U.S. fifty dollar bill may be permitted, but a denomination of 100 for a U.S. one-hundred dollar bill may not be permitted. If the system controller 116 determines that the denomination of the unit of a currency is not permitted, the process continues at 1118, where the control system 116 may determine that there are zero available entertainment credits. In some situations, an operator of the game-entertainment system 100 may want to reject certain denominations while permitting other denominations such as when the operator has reason to suspect counterfeit bills of a certain denomination are currently being circulated.

Referring back to 1104, if the system controller 116 determines the identity of the item of value provided to the game system 106 was a financial medium based at least in part on the received session request, the process continues at 1114. In some situations, the system controller 116 might determine an exchange rate if the financial medium employs a currency different from a local currency.

At 1114, the system controller 116 may determine a purchase amount based at least in part on the determined denomination and the determined exchange rate if the item of value provided to the game system 106 was a unit of a currency. However, if the item of value provided to the game system 106 was a financial card, the system controller 116 may determine a purchase amount based at least in part on the received session request.

At 1116, the system controller 116 opens an account and may associate the account with a number of entertainment credits based at least in part on the determined purchase amount.

At 1118, the system controller 116 determines a number of available entertainment credits. The number of available entertainment credits may be associated with the newly opened account if the item of value received at the game system 106 was not a ticket. However, if the item of value received at the game system 106 was a ticket, the number of available entertainment credits may the credit amount of the account that is associated with the ticket. In some situations, the ticket may have already been redeemed and improperly thrown away. In that case, the number of available entertainment credits may be zero.

At 1120, the system controller 116 sends a session authorization to the game system. The session authorization may be indicative of a grant or denial of authorization for access to an instance of game play. The session authorization may be indicative of a number of available entertainment credits.

At 1122, the system controller 116 zeros the number of entertainment credits associated with the account and closes the account.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to ticket payment systems, not necessarily the exemplary game-entertainment system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, in one embodiment, the IOV subsystem may be communicatively coupled to a remote server/computer system, and the remote server/computer system may generate a pseudo ticket code when an item of value is not a ticket. The remote server/computer system may provide the pseudo ticket code to the IOV subsystem which may then provide the pseudo ticket code to the game session subsystem.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A game system communicatively coupled to a game-session authorizer that provides account information indicative of a number of entertainment credits based at least on one received valid item of value, comprising:
    an item of value receiver configured to receive a purported item of value, the purported item of value being one of a unit of a currency or a ticket;
    a validator operable to determine whether the purported item of value is a valid or invalid item of value for the purpose of purchasing the session of game play and operable to determine whether the validated item of value is a respective ticket or a respective unit of a respective currency and operable to provide a ticket code indicative of unique ticket identification information for the respective ticket if the validated item of value is the respective ticket, wherein the ticket code is formatted in accordance with a defined format, and operable to provide currency information indicative of a denomination of the respective unit of a respective currency if the validated item of value is the respective unit of a respective currency;
    a pseudo ticket code generator communicatively coupled to the validator and operable to generate a pseudo ticket code indicative of the denomination of the unit of a respective currency based at least on the currency information, wherein the pseudo ticket code is formatted in accordance with the defined format of the ticket code;
    a session requester communicatively coupled to the validator and the pseudo ticket code generator and operable to generate a game-session request based at least in part on one of the ticket code if the validated item of value is the respective ticket and the pseudo ticket code if the validated item of value is different from the respective ticket; and
    a game controller configured to receive a session authorization indicative of a number of available entertainment credits and operable to provide a first instance game play if, and only if, the number of available entertainment credits indicated by the session authorization is above a threshold.

2. The game system of claim 1 wherein the pseudo ticket code is further indicative of the respective currency of the unit.

3. The game system of claim 1 wherein the item of value receiver is further configured to receive a financial card, wherein the validator is further operable to determine whether the validated item of value is a respective financial medium and operable to provide financial medium information indicative of a monetary amount if the validated item of value is the respective financial card, and wherein the pseudo ticket code generator is further operable to generate a respective pseudo ticket code indicative of the monetary amount based at least on the financial medium information.

4. The game system of claim 1 wherein the validator is further configured to read from the respective ticket a machine-readable symbol encoding the unique ticket identification information for the respective ticket.

5. The game system of claim 1 wherein the pseudo ticket code generator is further operable to generate the respective pseudo ticket code to be indicative of the denomination of the unit of a respective currency and to be indicative of a number of units of a respective currency validated by the validator based at least on the currency information.

6. A game system communicatively coupled to a game-session authorizer that provides account information indicative of a number of entertainment credits based at least on one received valid item of value, comprising:
    means for validating a purported item of value as being one of a valid ticket having a ticket identifier indicative of a ticket code or a unit of a currency having a denomination, the means for validating a purported item of value configured to provide the ticket code if the purported item of value is a respective valid ticket and configured to provide currency information indicative of at least the denomination if the purported item of value is a respective valid unit of a respective currency;

means for generating a pseudo ticket code indicative of the denomination of the respective unit of a respective currency based at least on the currency information;

means for generating a session request having a defined format based at least on one of the ticket code provided by the means for validating the purported item of value or the pseudo ticket code indicative of the denomination of the respective unit of a respective currency provided by the means for generating a pseudo ticket code;

means for sending a session request to a remote game session authorizer;

means for receiving authorization indicative of a number of entertainment credits from the remote authorizer; and means for controlling access to a game configured to deny access to a game whenever the means for controlling access to a game receives information indicative of a respective unit of a respective currency being provided to purchase an instance of game play and configured to provide access to the game only upon receiving authorization indicative of a respective number of entertainment credits from the remote controller via the means for receiving authorization.

7. The game system of claim 6, further including:
means for counting a number of validated units of a respective currency, wherein the pseudo ticket code is further indicative of the number of validated units of a respective currency.

8. The game system of claim 6 wherein if the purported item of value is the respective unit of a respective currency, the session request is indicative of the denomination of the respective unit of a respective currency.

9. The game system of claim 8 wherein if the purported item of value is the respective ticket, the session request is indicative of the ticket code.

10. The game system of claim 9, further comprising:
means for reading a machine-readable symbol encoding the ticket code from the ticket, wherein the ticket code is indicative of unique ticket identification information.

11. A method, comprising:
receiving, with one or more configured computing devices, an indication of a purported item of value;
determining, with the one or more configured computing devices and based on the received indication, whether the purported item of value is a valid unit of a currency, a valid ticket, or invalid for the purposes of purchasing an instance of game play at a gaming machine;
if the purported item of value is the respective unit of a respective currency,
  determining, with the one or more configured computing devices, a denomination of the respective unit of a respective currency,
  generating, with the one or more configured computing devices, a first pseudo ticket code indicative of at least the denomination of the respective unit of a respective currency based at least in part on the denomination of the respective unit of a currency, and
  providing, with the one or more configured computing devices, the first pseudo ticket code indicative of at least the denomination of the respective unit of a respective currency to a request generator in a defined ticket code format;
generating, with the one or more configured computing devices and in accordance with a defined format, a session request based at least on one of a ticket code or the first pseudo ticket code, wherein the session request is indicative of a ticket code if the session request is based at least on the ticket code for a ticket, and wherein the session request is indicative of the denomination of the respective unit of a respective currency if the session request is based at least on the first pseudo ticket code;

sending, with the one or more configured computing devices, the session request to a remote entertainment credit manager;

receiving, with the one or more configured computing devices, session authorization indicative of a number of entertainment credits the remote entertainment credit manager;

determining, with the one or more configured computing devices, an available entertainment credit amount based at least on the received session authorization at a game controller;

determining, with the one or more configured computing devices, whether the available entertainment credit amount is above a threshold level at a game controller; and providing an instance of game play if, and only if, the available entertainment credit amount is above the threshold level.

12. The method of claim 11 wherein providing an instance of game play if, and only if, the available entertainment credit amount is above the threshold level further comprises denying access to an instance of game play whenever the game controller receives an indication that the respective unit of a respective currency was received by the game machine.

13. The method of claim 11, further comprising:
incrementing a counter in response to the respective unit of a respective currency being valid, and wherein generating a first pseudo ticket code indicative of at least the denomination of the respective unit of a respective currency based at least in part on the denomination of the respective unit of a currency further includes
generating the first pseudo ticket code indicative of at least a count of the counter and the denomination of the respective unit of a respective currency based at least in part on the denomination of the respective unit of a currency and the count of the counter.

14. The method of claim 11 wherein generating a first pseudo ticket code indicative of at least the denomination of the respective unit of a respective currency based at least in part on the denomination of the respective unit of a currency further comprises formatting the first pseudo ticket code in accordance with the defined ticket code format.

15. The method of claim 14, further comprising:
receiving a financial medium associated with a financial account;
receiving an indication of a monetary amount payable from the financial account;
generating a second pseudo ticket code indicative of at least the monetary amount based at least in part on the monetary amount; and
providing the second pseudo ticket code indicative of at least the monetary amount to the request generator in the defined ticket code format, and
wherein generating in accordance with a defined format a session request based at least on one of a ticket code or the first pseudo ticket code, wherein the session request is indicative of a ticket code if the session request is based at least on a ticket code for a ticket, and wherein the session request is indicative of the denomination of the respective unit of a respective currency if the session request is based at least on the first pseudo ticket code further includes, generating in accordance with the defined format a session request based at least on one of the ticket code, the first pseudo ticket code, or the second pseudo ticket code, wherein the session request is indicative of the monetary amount if the session request is based at least on the second pseudo ticket code.

16. The method of claim 11, further comprising:
if the purported item of value is the respective ticket,
reading a ticket identifier indicative of the ticket code from the respective ticket; and
providing the ticket code to a request generator in a defined ticket code format.

* * * * *